United States Patent
Maxey et al.

(10) Patent No.: US 10,400,160 B2
(45) Date of Patent: Sep. 3, 2019

(54) CROSSLINKED POLYMER-COATED PROPPANT

(71) Applicant: Halliburton Energy Services, Inc., Houston, TX (US)

(72) Inventors: Jason Eric Maxey, Spring, TX (US); Travis Hope Larsen, Houston, TX (US); Walter T. Stephens, Houston, TX (US); Antonio Recio, III, Humble, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 15/747,407

(22) PCT Filed: Sep. 22, 2015

(86) PCT No.: PCT/US2015/051496
§ 371 (c)(1),
(2) Date: Jan. 24, 2018

(87) PCT Pub. No.: WO2017/052515
PCT Pub. Date: Mar. 30, 2017

(65) Prior Publication Data
US 2018/0215996 A1   Aug. 2, 2018

(51) Int. Cl.
*E21B 43/267* (2006.01)
*C09K 8/80* (2006.01)
*C09K 8/62* (2006.01)

(52) U.S. Cl.
CPC ............... *C09K 8/805* (2013.01); *C09K 8/62* (2013.01); *E21B 43/267* (2013.01)

(58) Field of Classification Search
CPC .. C09K 8/805; C09K 8/62; C09K 8/80; E21B 43/267; E21B 43/26; E21B 33/13; E21B 37/06; E21B 43/16
See application file for complete search history.

(56) References Cited

U.S. PATENT DOCUMENTS

| | | |
|---|---|---|
| 6,176,315 B1 | 1/2001 | Reddy et al. |
| 6,192,986 B1 | 2/2001 | Urlwin-Smith |
| 2004/0244978 A1 | 12/2004 | Shaarpour |
| 2008/0302570 A1 | 12/2008 | deBoer |
| 2011/0120719 A1 | 5/2011 | Soane et al. |
| 2013/0000905 A1 | 1/2013 | Reddy et al. |

(Continued)

FOREIGN PATENT DOCUMENTS

WO   2013158308   10/2013

OTHER PUBLICATIONS

International Search Report and Written Opinion of PCT Application No. PCAT/US2015/051496 dated Jun. 22, 2016: pp. 1-10.

*Primary Examiner* — Zakiya W Bates
(74) *Attorney, Agent, or Firm* — Chamberlain Hrdlicka

(57) ABSTRACT

A method of treating a subterranean formation is disclosed. The method can include placing in the subterranean formation a crosslinked composition that includes proppant particles including polymer coatings thereon. The crosslinked composition includes inter-particle crosslinks between the polymer coatings of at least some of the proppant particles. The inter-particle crosslinks includes a crosslinker.

16 Claims, 3 Drawing Sheets

(56) References Cited

U.S. PATENT DOCUMENTS

| | | | |
|---|---|---|---|
| 2013/0186624 A1* | 7/2013 | McCrary | C09K 8/805 |
| | | | 166/280.1 |
| 2013/0277054 A1 | 10/2013 | Reddy et al. | |
| 2014/0014348 A1 | 1/2014 | Mahoney et al. | |
| 2014/0338906 A1 | 11/2014 | Monastiriotis et al. | |
| 2015/0114649 A1* | 4/2015 | Osorio | C09K 8/44 |
| | | | 166/305.1 |
| 2015/0252252 A1 | 9/2015 | Soane et al. | |
| 2016/0137904 A1* | 5/2016 | Drake | C09K 8/536 |
| | | | 507/219 |

* cited by examiner

CROSSLINKED POLYMER-COATED PROPPANT

BACKGROUND

Hydrocarbon-producing wells are often stimulated by hydraulic fracturing treatments. In hydraulic fracturing treatments, a viscous fracturing fluid is pumped into a producing zone to be fractured at a rate and pressure such that one or more fractures are formed in the zone. Particulate solids for propping open the fractures, commonly referred to in the art as "proppant," are generally suspended in at least a portion of the fracturing fluid so that the particulate solids are deposited in the fractures when the fracturing fluid flows back as a low viscosity broken fluid to the surface. The proppant deposited in the fractures functions to prevent the fractures from fully closing and maintains conductive channels through which produced hydrocarbons can flow. However, the proppant deposited in the fractures can pack very tightly, which can hinder the flow of produced hydrocarbons.

BRIEF DESCRIPTION OF THE FIGURES

The drawings illustrate generally, by way of example, but not by way of limitation, various embodiments discussed in the present document.

DETAILED DESCRIPTION OF THE INVENTION

Figure 1:
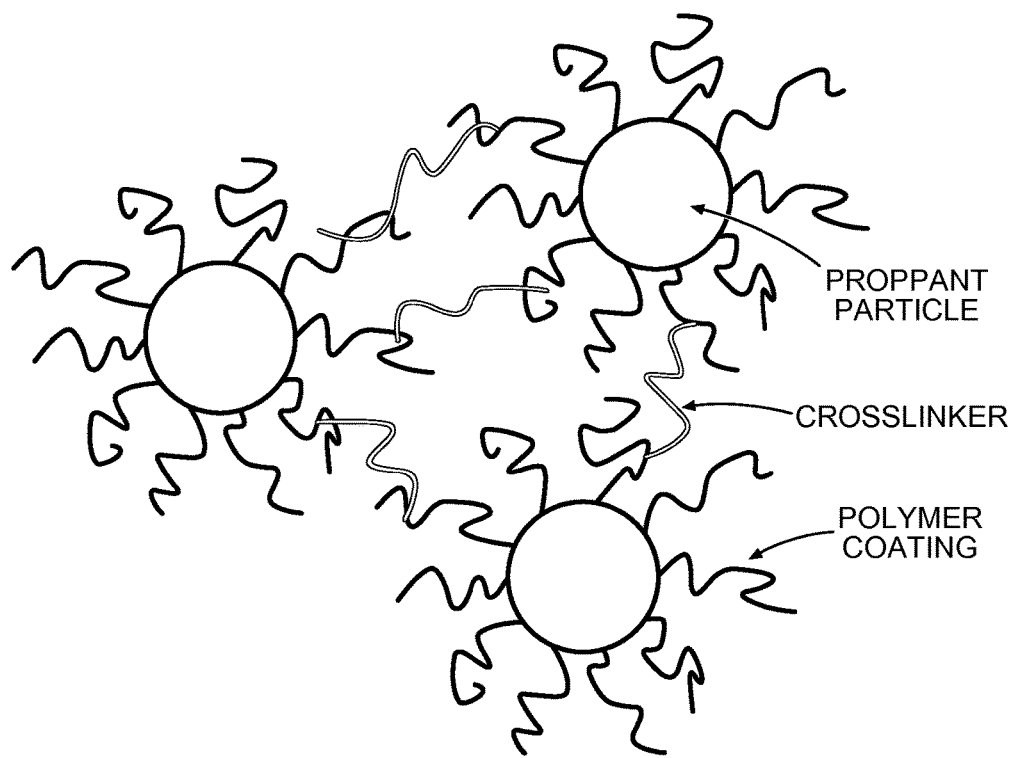
FIG. 1 illustrates crosslinked polymer-coated proppant particles, in accordance with various embodiments.

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

In this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section. A comma can be used as a delimiter or digit group separator to the left or right of a decimal mark; for example, "0.000,1" is equivalent to "0.0001."

In the methods described herein, the acts can be carried out in any order without departing from the principles of the invention, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range, and includes the exact stated value or range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%.

The term "organic group" as used herein refers to any carbon-containing functional group. For example, an oxygen-containing group such as an alkoxy group, aryloxy group, aralkyloxy group, oxo(carbonyl) group; a carboxyl group including a carboxylic acid, carboxylate, and a carboxylate ester; a sulfur-containing group such as an alkyl and aryl sulfide group; and other heteroatom-containing groups. Non-limiting examples of organic groups include OR, OOR, OC(O)N(R)$_2$, CN, CF$_3$, OCF$_3$, R, C(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, C(=NOR)R, and substituted or unsubstituted (C$_1$-C$_{100}$)hydrocarbyl, wherein R can be hydrogen (in examples that include other carbon atoms) or a carbon-based moiety, and wherein the carbon-based moiety can itself be substituted or unsubstituted.

The term "substituted" as used herein in conjunction with a molecule or an organic group as defined herein refers to the state in which one or more hydrogen atoms contained therein are replaced by one or more non-hydrogen atoms. The term "functional group" or "substituent" as used herein refers to a group that can be or is substituted onto a molecule or onto an organic group. Examples of substituents or functional groups include, but are not limited to, a halogen (e.g., F, Cl, Br, and I); an oxygen atom in groups such as hydroxy groups, alkoxy groups, aryloxy groups, aralkyloxy groups, oxo(carbonyl) groups, carboxyl groups including carboxylic acids, carboxylates, and carboxylate esters; a sulfur atom in groups such as thiol groups, alkyl and aryl sulfide groups, sulfoxide groups, sulfone groups, sulfonyl groups, and sulfonamide groups; a nitrogen atom in groups such as amines, hydroxyamines, nitriles, nitro groups, N-oxides, hydrazides, azides, and enamines; and other heteroatoms in various other groups. Non-limiting examples of substituents that can be bonded to a substituted carbon (or other) atom include F, Cl, Br, I, OR, OC(O)N(R)$_2$, CN, NO, NO$_2$, ONO$_2$, azido, CF$_3$, OCF$_3$, R, O (oxo), S (thiono), C(O), S(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, and C(=NOR)R, wherein R can be hydrogen or a carbon-based moiety; for example, R can be hydrogen, (C$_1$-C$_{100}$)hydrocarbyl, alkyl, acyl, cycloalkyl, aryl, aralkyl, heterocyclyl, heteroaryl, or heteroarylalkyl; or wherein two R groups bonded to a nitrogen atom or to adjacent nitrogen atoms can together with the nitrogen atom or atoms form a heterocyclyl.

The term "alkyl" as used herein refers to straight chain and branched alkyl groups and cycloalkyl groups having from 1 to 40 carbon atoms, 1 to about 20 carbon atoms, 1 to 12 carbons or, in some embodiments, from 1 to 8 carbon atoms. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, t-butyl, neopentyl, isopentyl, and 2,2-dimethylpropyl groups. As used herein, the term "alkyl" encompasses n-alkyl, isoalkyl, and anteisoalkyl groups as well as other branched chain forms of alkyl. Representative substituted alkyl groups can be substituted one or more times with any of the groups listed herein, for example, amino, hydroxy, cyano, carboxy, nitro, thio, alkoxy, and halogen groups.

The term "alkenyl" as used herein refers to straight and branched chain and cyclic alkyl groups as defined herein, except that at least one double bond exists between two carbon atoms. Thus, alkenyl groups have from 2 to 40 carbon atoms, or 2 to about 20 carbon atoms, or 2 to 12 carbon atoms or, in some embodiments, from 2 to 8 carbon atoms. Examples include, but are not limited to vinyl, —CH=CH(CH$_3$), —CH=C(CH$_3$)$_2$, —C(CH$_3$)=CH$_2$, —C(CH$_3$)=CH(CH$_3$), —C(CH$_2$CH$_3$)=CH$_2$, cyclohexenyl, cyclopentenyl, cyclohexadienyl, butadienyl, pentadienyl, and hexadienyl among others.

The term "alkynyl" as used herein refers to straight and branched chain alkyl groups, except that at least one triple bond exists between two carbon atoms.

The term "acyl" as used herein refers to a group containing a carbonyl moiety wherein the group is bonded via the carbonyl carbon atom. The carbonyl carbon atom is bonded to a hydrogen forming a "formyl" group or is bonded to another carbon atom, which can be part of an alkyl, aryl, aralkyl cycloalkyl, cycloalkylalkyl, heterocyclyl, heterocyclylalkyl, heteroaryl, heteroarylalkyl group or the like. An acyl group can include 0 to about 12, 0 to about 20, or 0 to about 40 additional carbon atoms bonded to the carbonyl group. An acyl group can include double or triple bonds within the meaning herein. An acryloyl group is an example of an acyl group. An acyl group can also include heteroatoms within the meaning herein. A nicotinoyl group (pyridyl-3-carbonyl) is an example of an acyl group within the meaning herein. Other examples include acetyl, benzoyl, phenylacetyl, pyridylacetyl, cinnamoyl, and acryloyl groups and the like. When the group containing the carbon atom that is bonded to the carbonyl carbon atom contains a halogen, the group is termed a "haloacyl" group. An example is a trifluoroacetyl group.

The term "cycloalkyl" as used herein refers to cyclic alkyl groups such as, but not limited to, cyclopropyl, cyclobutyl, cyclopentyl, cyclohexyl, cycloheptyl, and cyclooctyl groups. In some embodiments, the cycloalkyl group can have 3 to about 8-12 ring members, whereas in other embodiments the number of ring carbon atoms range from 3 to 4, 5, 6, or 7. Cycloalkyl groups further include polycyclic cycloalkyl groups such as, but not limited to, norbornyl, adamantyl, bornyl, camphenyl, isocamphenyl, and carenyl groups, and fused rings such as, but not limited to, decalinyl, and the like. Cycloalkyl groups also include rings that are substituted with straight or branched chain alkyl groups as defined herein. Representative substituted cycloalkyl groups can be mono-substituted or substituted more than once, such as, but not limited to, 2,2-, 2,3-, 2,4- 2,5- or 2,6-disubstituted cyclohexyl groups or mono-, di- or tri-substituted norbornyl or cycloheptyl groups, which can be substituted with, for example, amino, hydroxy, cyano, carboxy, nitro, thio, alkoxy, and halogen groups. The term "cycloalkenyl" alone or in combination denotes a cyclic alkenyl group.

The term "aryl" as used herein refers to cyclic aromatic hydrocarbon groups that do not contain heteroatoms in the ring. Thus aryl groups include, but are not limited to, phenyl, azulenyl, heptalenyl, biphenyl, indacenyl, fluorenyl, phenanthrenyl, triphenylenyl, pyrenyl, naphthacenyl, chrysenyl, biphenylenyl, anthracenyl, and naphthyl groups. In some embodiments, aryl groups contain about 6 to about 14 carbons in the ring portions of the groups. Aryl groups can be unsubstituted or substituted, as defined herein. Representative substituted aryl groups can be mono-substituted or substituted more than once, such as, but not limited to, a phenyl group substituted at any one or more of 2-, 3-, 4-, 5-, or 6-positions of the phenyl ring, or a naphthyl group substituted at any one or more of 2- to 8-positions thereof.

The term "heterocyclyl" as used herein refers to aromatic and non-aromatic ring compounds containing three or more ring members, of which one or more is a heteroatom such as, but not limited to, N, O, and S.

The term "amine" as used herein refers to primary, secondary, and tertiary amines having, e.g., the formula N(group)$_3$ wherein each group can independently be H or non-H, such as alkyl, aryl, and the like. Amines include but are not limited to R—NH$_2$, for example, alkylamines, arylamines, alkylarylamines; R$_2$NH wherein each R is independently selected, such as dialkylamines, diarylamines, aralkylamines, heterocyclylamines and the like; and R$_3$N wherein each R is independently selected, such as trialkylamines, dialkylarylamines, alkyldiarylamines, triarylamines, and the like. The term "amine" also includes ammonium ions as used herein.

The term "amino group" as used herein refers to a substituent of the form —NH$_2$, —NHR, —NR$_2$, —NR$_3^+$, wherein each R is independently selected, and protonated forms of each, except for —NR$_3^+$, which cannot be protonated. Accordingly, any compound substituted with an amino group can be viewed as an amine. An "amino group" within the meaning herein can be a primary, secondary, tertiary, or quaternary amino group. An "alkylamino" group includes a monoalkylamino, dialkylamino, and trialkylamino group.

The terms "halo," "halogen," or "halide" group, as used herein, by themselves or as part of another substituent, mean, unless otherwise stated, a fluorine, chlorine, bromine, or iodine atom.

The term "haloalkyl" group, as used herein, includes mono-halo alkyl groups, poly-halo alkyl groups wherein all halo atoms can be the same or different, and per-halo alkyl groups, wherein all hydrogen atoms are replaced by halogen atoms, such as fluoro. Examples of haloalkyl include trifluoromethyl, 1,1-dichloroethyl, 1,2-dichloroethyl, 1,3-dibromo-3,3-difluoropropyl, perfluorobutyl, and the like.

The term "hydrocarbon" or "hydrocarbyl" as used herein refers to a molecule or functional group, respectively, that includes carbon and hydrogen atoms. The term can also refer to a molecule or functional group that normally includes both carbon and hydrogen atoms but wherein all the hydrogen atoms are substituted with other functional groups. A hydrocarbyl group can be a functional group derived from a straight chain, branched, or cyclic hydrocarbon, and can be alkyl, alkenyl, alkynyl, aryl, cycloalkyl, acyl, or any combination thereof. Hydrocarbyl groups can be shown as $(C_a\text{-}C_b)$hydrocarbyl, wherein a and b are positive integers and mean having any of a to b number of carbon atoms. For example, $(C_1\text{-}C_4)$hydrocarbyl means the hydrocarbyl group can be methyl ($C_1$), ethyl ($C_2$), propyl ($C_3$), or butyl ($C_4$), and $(C_0\text{-}C_b)$hydrocarbyl means in certain embodiments there is no hydrocarbyl group.

The term "solvent" as used herein refers to a liquid that can dissolve a solid, liquid, or gas. Non-limiting examples of solvents are silicones, organic compounds, water, alcohols, ionic liquids, and supercritical fluids.

The term "room temperature" as used herein refers to a temperature of about 15° C. to 28° C.

The term "standard temperature and pressure" as used herein refers to 20° C. and 101 kPa.

As used herein, "degree of polymerization" is the number of repeating units in a polymer.

As used herein, the term "polymer" refers to a molecule having at least one repeating unit and can include copolymers.

The term "copolymer" as used herein refers to a polymer that includes at least two different repeating units. A copolymer can include any suitable number of repeating units.

The term "downhole" as used herein refers to under the surface of the earth, such as a location within or fluidly connected to a wellbore.

As used herein, the term "drilling fluid" refers to fluids, slurries, or muds used in drilling operations downhole, such as during the formation of the wellbore.

As used herein, the term "stimulation fluid" refers to fluids or slurries used downhole during stimulation activities of the well that can increase the production of a well, including perforation activities. In some examples, a stimulation fluid can include a fracturing fluid or an acidizing fluid.

As used herein, the term "fracturing fluid" refers to fluids or slurries used downhole during fracturing operations.

As used herein, the term "spotting fluid" refers to fluids or slurries used downhole during spotting operations, and can be any fluid designed for localized treatment of a downhole region. In one example, a spotting fluid can include a lost circulation material for treatment of a specific section of the wellbore, such as to seal off fractures in the wellbore and prevent sag. In another example, a spotting fluid can include a water control material.

As used herein, the term "remedial treatment fluid" refers to fluids or slurries used downhole for remedial treatment of a well. Remedial treatments can include treatments designed to increase or maintain the production rate of a well, such as stimulation or clean-up treatments.

As used herein, the term "abandonment fluid" refers to fluids or slurries used downhole during or preceding the abandonment phase of a well.

As used herein, the term "water control material" refers to a solid or liquid material that interacts with aqueous material downhole, such that hydrophobic material can more easily travel to the surface and such that hydrophilic material (including water) can less easily travel to the surface. A water control material can be used to treat a well to cause the proportion of water produced to decrease and to cause the proportion of hydrocarbons produced to increase, such as by selectively binding together material between water-producing subterranean formations and the wellbore while still allowing hydrocarbon-producing formations to maintain output.

As used herein, the term "conformance" refers to diversion, fluid-loss control, or reduction of production of undesired materials, and can include downhole disposal of unwanted materials such as water, gas, sand, and the like.

As used herein, the term "fluid" refers to liquids and gels, unless otherwise indicated.

As used herein, the term "subterranean material" or "subterranean formation" refers to any material under the surface of the earth, including under the surface of the bottom of the ocean. For example, a subterranean formation or material can be any section of a wellbore and any section of a subterranean petroleum- or water-producing formation or region in fluid contact with the wellbore. Placing a material in a subterranean formation can include contacting the material with any section of a wellbore or with any subterranean region in fluid contact therewith. Subterranean materials can include any materials placed into the wellbore such as cement, drill shafts, liners, tubing, casing, or screens; placing a material in a subterranean formation can include contacting with such subterranean materials. In some examples, a subterranean formation or material can be any below-ground region that can produce liquid or gaseous petroleum materials, water, or any section below-ground in fluid contact therewith. For example, a subterranean formation or material can be at least one of an area desired to be fractured, a fracture or an area surrounding a fracture, and a flow pathway or an area surrounding a flow pathway, wherein a fracture or a flow pathway can be optionally fluidly connected to a subterranean petroleum- or water-producing region, directly or through one or more fractures or flow pathways.

As used herein, "treatment of a subterranean formation" can include any activity directed to extraction of water or petroleum materials from a subterranean petroleum- or water-producing formation or region, for example, including stimulation, hydraulic fracturing, clean-up, acidizing, completion, cementing, remedial treatment, abandonment, and the like.

As used herein, a "flow pathway" downhole can include any suitable subterranean flow pathway through which two subterranean locations are in fluid connection. The flow pathway can be sufficient for petroleum or water to flow from one subterranean location to the wellbore or vice-versa. A flow pathway can include at least one of a hydraulic fracture, and a fluid connection across a screen, across gravel pack, across proppant, including across resin-bonded proppant or proppant deposited in a fracture, and across sand. A flow pathway can include a natural subterranean passageway through which fluids can flow. In some embodiments, a flow pathway can be a water source and can include water. In some embodiments, a flow pathway can be a petroleum source and can include petroleum. In some embodiments, a flow pathway can be sufficient to divert from a wellbore, fracture, or flow pathway connected thereto at least one of water, a downhole fluid, or a produced hydrocarbon.

As used herein, a "carrier fluid" refers to any suitable fluid for suspending, dissolving, mixing, or emulsifying with one or more materials to form a composition. For example, the carrier fluid can be at least one of crude oil, dipropylene glycol methyl ether, dipropylene glycol dimethyl ether, dipropylene glycol methyl ether, dipropylene glycol dimethyl ether, dimethyl formamide, diethylene glycol methyl ether, ethylene glycol butyl ether, diethylene glycol butyl ether, butylglycidyl ether, propylene carbonate, D-limonene, a $C_2$-$C_{40}$ fatty acid $C_1$-$C_{10}$ alkyl ester (e.g., a fatty acid methyl ester), tetrahydrofurfuryl methacrylate, tetrahydrofurfuryl acrylate, 2-butoxy ethanol, butyl acetate, butyl lactate, furfuryl acetate, dimethyl sulfoxide, dimethyl formamide, a petroleum distillation product or fraction (e.g., diesel, kerosene, napthas, and the like) mineral oil, a hydrocarbon oil, a hydrocarbon including an aromatic carbon-carbon bond (e.g., benzene, toluene), a hydrocarbon including an alpha olefin, xylenes, an ionic liquid, methyl ethyl ketone, an ester of oxalic, maleic or succinic acid, methanol, ethanol, propanol (iso- or normal-), butyl alcohol (iso-, tert-, or normal-), an aliphatic hydrocarbon (e.g., cyclohexanone, hexane), water, brine, produced water, flowback water, brackish water, and sea water. The fluid can form about 0.001 wt % to about 99.999 wt % of a composition, or a mixture including the same, or about 0.001 wt % or less, 0.01 wt %, 0.1, 1, 2, 3, 4, 5, 6, 8, 10, 15, 20, 25, 30, 35, 40, 45, 50, 55, 60, 65, 70, 75, 80, 85, 90, 95, 96, 97, 98, 99, 99.9, 99.99, or about 99.999 wt % or more.

In various embodiments, salts having a positively charged counterion can include any suitable positively charged counterion. For example, the counterion can be ammonium ($NH_4^+$), or an alkali metal such as sodium ($Na^+$), potassium ($K^+$), or lithium ($Li^+$). In some embodiments, the counterion can have a positive charge greater than +1, which can in some embodiments complex to multiple ionized groups, such as $Zn^{2+}$, $Al^{3+}$, or alkaline earth metals such as $Ca^{2+}$ or $Mg^{2+}$.

In various embodiments, salts having a negatively charged counterion can include any suitable negatively charged counterion. For example, the counterion can be a halide, such as fluoride, chloride, iodide, or bromide. In other examples, the counterion can be nitrate, hydrogen sulfate, dihydrogen phosphate, bicarbonate, nitrite, perchlorate, iodate, chlorate, bromate, chlorite, hypochlorite, hypobromite, cyanide, amide, cyanate, hydroxide, permanganate. The counterion can be a conjugate base of any carboxylic acid, such as acetate or formate. In some embodiments, a counterion can have a negative charge greater than −1, which can in some embodiments complex to multiple ionized groups, such as oxide, sulfide, nitride, arsenate, phosphate, arsenite, hydrogen phosphate, sulfate, thiosulfate, sulfite, carbonate, chromate, dichromate, peroxide, or oxalate.

The polymers described herein can terminate in any suitable way. In some embodiments, the polymers can terminate with an end group that is independently chosen from a suitable polymerization initiator, —H, —OH, a substituted or unsubstituted $(C_1$-$C_{20})$hydrocarbyl (e.g., $(C_1$-$C_{10})$alkyl or $(C_6$-$C_{20})$aryl) interrupted with 0, 1, 2, or 3 groups independently selected from —O—, substituted or unsubstituted —NH—, and —S—, a poly(substituted or unsubstituted $(C_1$-$C_{20})$hydrocarbyloxy), and a poly(substituted or unsubstituted $(C_1$-$C_{20})$hydrocarbylamino).

In various embodiments, the present invention provides a method of treating a subterranean formation. The method includes placing in the subterranean formation a crosslinked composition. The crosslinked composition includes proppant particles including polymer coatings thereon. The crosslinked composition also includes inter-particle crosslinks between the polymer coatings of at least some of the proppant particles. The inter-particle crosslinks include a crosslinker.

In various embodiments, the present invention provides a method of treating a subterranean formation. The method includes placing in the subterranean formation a crosslinked composition. The crosslinked composition includes proppant particles including polymer coatings thereon. The polymer coating is a water-swollen hydrogel that includes polyacrylamide (PA), a copolymer of acrylamide and a sulfonic acid-containing monomer, a copolymer of sulfonated styrene and maleic anhydride, a terpolymer of acrylamide, a sulfonic acid-containing monomer, a cationic acid-containing monomer, or a combination thereof. The crosslinked composition includes inter-particle crosslinks between the polymer coatings of at least some of the proppant particles. The inter-particle crosslinks include a crosslinker including polyethyleneimine (PEI).

In various embodiments, the present invention provides a system that includes a tubular disposed in a subterranean formation. The system also includes a pump configured to pump a pre-crosslinked composition, or a crosslinked product thereof, in the subterranean formation through the tubular. The crosslinked product formed from the pre-crosslinked composition includes proppant particles including polymer coatings thereon. The crosslinked product of the pre-crosslinked composition also includes inter-particle crosslinks between the polymer coatings of at least some of the proppant particles, the inter-particle crosslinks including a crosslinker.

In various embodiments, the present invention provides a pre-crosslinked composition for treatment of a subterranean formation. The composition includes proppant particles including polymer coatings thereon. The composition includes a crosslinker effective for forming inter-particle crosslinks between the polymer coatings of at least some of the proppant particles. In various embodiments, the present invention provides a crosslinked product of the pre-crosslinked composition.

In various embodiments, the present invention provides a crosslinked composition for treatment of a subterranean formation. The crosslinked composition includes proppant particles including polymer coatings thereon. The crosslinked composition also includes inter-particle crosslinks between the polymer coatings of at least some of the proppant particles, the inter-particle crosslinks including a crosslinker.

In various embodiments, the present invention provides a method of preparing a composition for treatment of a subterranean formation. The method includes forming a pre-crosslinked composition or a crosslinked product thereof. The pre-crosslinked composition includes proppant particles including polymer coatings thereon. The pre-crosslinked composition also includes a crosslinker effective for forming inter-particle crosslinks between the polymer coatings of at least some of the proppant particles. In various embodiments, the method further includes crosslinking the pre-crosslinked composition to form a crosslinked composition.

In various embodiments, the present invention provides certain advantages over other methods of treating subterranean formations, at least some of which are unexpected. For example, in various embodiments, the method of the present invention can provide an easier, faster, or less expensive way to deliver proppant, such as compared to methods including resin-coated proppants. In various embodiments, the coated proppant particles of the present invention can swell with water, making them less dense, easier to suspend, and easier to place in a desired subterranean location than proppants used in other methods, such as resin-coated proppants. In various embodiments, the crosslinked coated proppant particles of the present invention can provide a greater conductivity proppant pack that has a higher pore volume, as compared to other proppant packs, such as higher than untreated proppant or higher than proppant treated with resin. In various embodiments, the crosslinking of the crosslinked coated proppant of the present invention can securely hold the proppant particles in place, and can provide less proppant flowback than other types of proppant, such as untreated proppant or resin-treated proppant. In various embodiments, the crosslinked coated proppant particles of the present invention can provide fines control, capturing fines particles and filtering them away from other produced materials. The fines control provided by various embodiments of the present invention can exceed the fines control provided by other proppants, such as by untreated proppant, or by resin-coated proppant. In various embodiments, the composition including the crosslinked proppant particles can have higher viscosity and higher elasticity, such as at higher temperatures, providing better proppant transport and increased length of generated fractures, as compared to other compositions including proppant particles.

In various embodiments, the method of the present invention can provide simplified transportation and workflow logistics. In various embodiments, the method of the present invention can be performed with fewer raw materials to transport to and combine at a work site, such as with proppant that is pre-coated with the polymer, avoiding transportation of a separate proppant coating. In various embodiments, the method of the present invention can avoid the inconvenience of applying sticky resins or other coatings to proppant particles. In various embodiments, the method can avoid transportation and combination of separate gelling agents and other fracturing fluid components.

In various embodiments, the concentration and type of the coating and the crosslinker can easily be varied to provide corresponding variation in the kinetics of the crosslinking and the properties of the resulting crosslinked network of coated proppant particles. In various embodiments, the present method can provide a higher degree of control over the rheology of the composition including the coated proppants than other methods including use of treated or untreated proppants. In various embodiments, by providing easy customization of properties of both the formation of the crosslinked network and the properties of the crosslinked network itself, the present method can be more easily customized not only to provide proppant packs in desired locations having specific desired conductivities or mechanical properties, but also proppant packs that have applications beyond producing high conductivity propped fractures, thereby providing a greater variety of applications as compared to untreated proppants or other treated proppants. For example, the crosslinked coated proppant particles can be designed to have little to no conductivity and can be used for diversion applications or for conformance applications. In various embodiments, the coated proppant particles can be used to form aggregates of proppant particles in a formed fracture, providing high conductivity channels for production, and providing bridging to prevent pinch points.

Method of Treating a Subterranean Formation.

In various embodiments, the present invention provides a method of treating a subterranean formation that can include placing in the subterranean formation a crosslinked composition. The crosslinked composition can include proppant particles that include polymer coatings thereon. The crosslinked composition can include inter-particle crosslinks between the polymer coatings of at least some of the proppant particles. The inter-particle crosslinks can include a crosslinker. FIG. 1 illustrates coated proppant with inter-particle crosslinks formed from a crosslinker.

The method can include obtaining or providing the crosslinked composition, such as by mixing the components thereof, by crosslinking a pre-crosslinked composition, or a combination thereof. The obtaining or providing of the crosslinked composition can occur above-surface, or in the subterranean formation. The method can include crosslinking a pre-crosslinked composition that includes the crosslinker (e.g., an unreacted form of the crosslinker that has not yet formed crosslinks between the coated particles) and the proppant particles including the polymer coating thereon, to form the crosslinked composition. The crosslinking can be performed above the surface. For example, the method can include crosslinking the pre-crosslinked composition above-surface to form the crosslinked composition, and subsequently placing the crosslinked composition in the subterranean formation. The crosslinking can be performed in the subterranean formation. For example, the method can include placing the pre-crosslinked composition in the subterranean formation, and subsequently crosslinking the pre-crosslinked composition, to form the crosslinked composition.

A proppant is a material that keeps an induced hydraulic fracture at least partially open during or after a fracturing treatment. Examples of proppants can include sand, gravel, glass beads, polymer beads, ground products from shells and seeds such as walnut hulls, and manmade materials such as ceramic proppant, bauxite, tetrafluoroethylene materials (e.g., TEFLON™ polytetrafluoroethylene), fruit pit materials, processed wood, composite particulates prepared from a binder and fine grade particulates such as silica, alumina, fumed silica, carbon black, graphite, mica, titanium dioxide, meta-silicate, calcium silicate, kaolin, talc, zirconia, boron, fly ash, hollow glass microspheres, and solid glass, or mixtures thereof. In some embodiments, the proppant can have an average particle size, wherein particle size is the largest dimension of a particle, of about 0.001 mm to about 3 mm, about 0.15 mm to about 2.5 mm, about 0.25 mm to about 0.43 mm, about 0.43 mm to about 0.85 mm, about 0.85 mm to about 1.18 mm, about 1.18 mm to about 1.70 mm, or about 1.70 to about 2.36 mm. In some embodiments, the proppant can have a distribution of particle sizes clustering around multiple averages, such as one, two, three, or four different average particle sizes. The crosslinked composition or pre-crosslinked composition can include any suitable amount of proppant, such as about 0.01 wt % to about 99.99 wt %, about 0.1 wt % to about 80 wt %, about 10 wt % to about 60 wt %, or about 0.01 wt % or less, or about 0.1 wt %, 1, 2, 3, 4, 5, 10, 15, 20, 30, 40, 50, 60, 70, 80, 85, 90, 91, 92, 93, 94, 95, 96, 97, 98, 99, about 99.9 wt %, or about 99.99 wt % or more. The proppant particles can be chosen or treated to have specific surface functionalities that increase adhesion to the polymer coating, such as epoxy groups, vinyl groups, amine groups, silyl groups, amine groups, hydroxy groups, and the like. For example, proppant particles comprising silica can be surface modified by silanes such as aminosilanes, vinylsilanes, epoxysilanes, and the like.

The placing of the crosslinked composition in the subterranean formation can include contacting the crosslinked composition and any suitable part of the subterranean formation, or contacting the crosslinked composition and a subterranean material, such as any suitable subterranean material. The subterranean formation can be any suitable subterranean formation. In some examples, the placing of the crosslinked composition in the subterranean formation includes contacting the crosslinked composition with or placing the crosslinked composition in at least one of a fracture, at least a part of an area surrounding a fracture, a flow pathway, an area surrounding a flow pathway, and an area desired to be fractured. The placing of the crosslinked composition in the subterranean formation can be any suitable placing and can include any suitable contacting between the subterranean formation and the crosslinked composition. The placing of the crosslinked composition in the subterranean formation can include at least partially depositing the crosslinked composition in a fracture, flow pathway, or area surrounding the same.

The method can include hydraulic fracturing, such as a method of hydraulic fracturing to generate a fracture or flow pathway. The placing of the crosslinked composition in the subterranean formation or the contacting of the subterranean formation and the hydraulic fracturing can occur at any time with respect to one another; for example, the hydraulic fracturing can occur at least one of before, during, and after the contacting or placing. In some embodiments, the contacting or placing occurs during the hydraulic fracturing, such as during any suitable stage of the hydraulic fracturing, such as during at least one of a pre-pad stage (e.g., during injection of water with no proppant, and additionally optionally mid- to low-strength acid), a pad stage (e.g., during injection of fluid only with no proppant, with some viscosifier, such as to begin to break into an area and initiate fractures to produce sufficient penetration and width to allow proppant-laden later stages to enter), or a slurry stage of the fracturing (e.g., viscous fluid with proppant). The method can include performing a stimulation treatment at least one of before, during, and after placing the crosslinked composition in the subterranean formation in the fracture, flow pathway, or area surrounding the same. The stimulation treatment can be, for example, at least one of perforating, acidizing, injecting of cleaning fluids, propellant stimulation, and hydraulic fracturing. In some embodiments, the stimulation treatment at least partially generates a fracture or flow pathway where the crosslinked composition is placed in or contacted to, or the crosslinked composition is placed in or contacted to an area surrounding the generated fracture or flow pathway.

In some embodiments, the method can be a method of fracturing, a method of placing the proppant particles in a fracture, a method of diversion, a method of conformance, or a combination thereof.

The coated proppant particles (e.g., swollen or non-swollen) can form any suitable proportion of the crosslinked composition or pre-crosslinked composition, such as about 0.01 wt % to about 99 wt % of the composition, about 0.01 wt % to about 50 wt % of the composition, or about 0.01 wt % or less, or about 0.1 wt %, 1, 2, 3, 4, 5, 6, 8, 10, 15, 20, 25, 30, 35, 40, 45, 50, 55, 60, 65, 70, 75, 80, 85, 86, 88, 90, 92, 94, 95, 96, 97, 98 wt %, or about 99 wt % or more.

In some embodiments, the coating on the coated proppant particles can, at least in part, separate from the coated proppant particles prior to the crosslinking. In such embodiments, during the crosslinking, the crosslinking can form crosslinks between the coatings of the particles, and the crosslinking can also form crosslinks between polymer molecules in solution. In such embodiments, the crosslinking between polymer molecules in solution can form a more viscous or gelled solution around the proppant particles. In various embodiments, the amount of time that the coated proppant is allowed to remain in solution prior to the crosslinking can be controlled such that a desired balance of inter-particle crosslinking and solution crosslinking is achieved during the crosslinking. Other variables that can be modified to change the proportion of inter-particle crosslinking versus solution crosslinking can be concentration of crosslinking accelerator (e.g., boric acid), concentration of coated proppant particles, thickness of polymer coating on coated proppant particles, concentration of the crosslinker, temperature of the solution, strength of adhesion of the polymer to the proppant particles, and strength of adhesion of the polymer coating to itself.

Polymer Coating.

The proppant particles of the crosslinked composition and the pre-crosslinked composition include polymer coatings thereon (e.g., one polymer coating per proppant particle, or multiple polymer coatings per polymer particle). The polymer coating can be any suitable coating that can be used to perform an embodiment of the method described herein. In some embodiments, the coating is a hydrogel coating (e.g., a polymer swellable with water), wherein the hydrogel can be water-swollen or substantially dry (e.g., not swollen with water). The polymer coating can include about 0.01 wt % to about 99.99% water, or about 50 wt % to about 99.99 wt % water, or about 0.01 wt % or less, or equal to or greater than 0.1 wt %, 1, 2, 3, 4, 5, 6, 8, 10, 15, 20, 25, 30, 35, 40, 45, 50, 55, 60, 65, 70, 75, 80, 85, 86, 88, 90, 92, 94, 95, 96, 97, 98, 99, 99.9%, or about 99.99 wt % or more.

The polymer coating can cover any suitable amount of the surface of the proppant particles, such as about 100% of the surface area of the proppant particles, or about 1% to about 100%, about 80% to about 100%, or about 1% or less, or about 2, 3, 4, 5, 6, 8, 10, 15, 20, 25, 30, 35, 40, 45, 50, 55, 60, 65, 70, 75, 80, 85, 86, 88, 90, 92, 94, 95, 96, 97, 98, 99, 99.9%, or about 100%.

The polymer coating can have any suitable thickness. For example, a polymer coating that is swollen with solvent (e.g., a water-swollen hydrogel) can have a thickness of about 0.01 microns to about 5000 microns, about 0.1 micron to about 1000 microns thick, or about 0.01 microns or less, or about 0.1 microns, 1, 2, 3, 4, 5, 10, 15, 20, 25, 50, 75, 100, 150, 200, 250, 300, 400, 500, 600, 700, 800, 900, 1,000, 1,250, 1,500, 1,750, 2,000, 2,500, 3,000, 4,000 microns, or about 5,000 microns or more. A polymer coating that is substantially not swollen with solvent (e.g., an unswollen hydrogel) can have a thickness of about 0.01 microns to about 500 microns, about 0.1 micron to about 250 microns thick, or about 0.01 microns or less, or about 0.1 microns, 1, 2, 3, 4, 5, 10, 15, 20, 25, 50, 75, 100, 150, 200, 250, 300, 400 microns, or about 500 microns or more.

The polymer coating can include one polymer or multiple polymers. Each polymer can independently be a homopolymer or a copolymer (e.g., random or block). The polymer coating includes a polymer or copolymer including a monomer unit chosen from (e.g., a polymerization product of)

acrylic acid, methacrylic acid, acrylamide, methacrylamide, carboxyethylacrylate, hydroxyethylmethacrylate (HEMA), hydroxyethylacrylate (HEA), polyethyleneglycol acrylates, N-isopropylacrylamide (NiPA), 2-acrylamido-2-methyl-1-propanesulfonic acid (AMPS), styrene sulfonic acid, allyl sulfonic acid, methallyl sulfonic acid, vinyl sulfonic acid, sodium salt of styrene sulfonate, vinylsulfonic acid, (meth) allylsulfonic acid, vinylphosphonic acid, N-vinylacetamide, N-methyl-N-vinylacetamide, N-vinylformamide, N-methyl-N-vinylformamide, N-vinylpyrrolidone, N-butyrolactam or N-vinylcaprolactam, maleic anhydride, itaconic acid, vinyl acetate, vinyl propanoate, vinyl butanoate, vinyl pentanoate, vinyl hexanoate, vinyl 2-methyl butanoate, vinyl 3-ethyl-pentanoate, dimethyldiallylammonium chloride, quaternized dimethylaminoethyl methacrylate (DMAEMA), methacrylamidopropyltrimethylammonium chloride, methylvinylimidazolium chloride, 2-vinylpyridine, 4-vinylpyridine, vinyl alcohol, a substituted or unsubstituted $(C_1-C_{20})$alkenoic acid (propenoic acid, butenoic acid, pentenoic acid, hexenoic acid, octenoic acid, nonenoic acid, decenoic acid, acrylic acid, methacrylic acid, hydroxypropyl acrylic acid, acrylamide, fumaric acid, methacrylic acid, hydroxypropyl acrylic acid, vinyl phosphonic acid, vinylidene diphosphonic acid, itaconic acid, crotonic acid, mesoconic acid, or citraconic acid), a substituted or unsubstituted $(C_1-C_{20})$alkenoic substituted or unsubstituted $(C_1-C_{20})$alkanoic anhydride (e.g., acrylic acid anhydride, fumaric acid anhydride, methacrylic acid anhydride, hydroxypropyl acrylic acid anhydride, vinyl phosphonic acid anhydride, vinylidene diphosphonic acid anhydride, itaconic acid anhydride, crotonic acid anhydride, mesoconic acid anhydride, citraconic acid anhydride, styrene sulfonic acid anhydride, allyl sulfonic acid anhydride, methallyl sulfonic acid anhydride, or vinyl sulfonic acid anhydride), a substituted or unsubstituted $(C_1-C_{20})$alkenoic substituted or unsubstituted $(C_1-C_{20})$alkenoic anhydride (e.g., propenoic acid anhydride, butenoic acid anhydride, pentenoic acid anhydride, hexenoic acid anhydride, octenoic acid anhydride, nonenoic acid anhydride, or decenoic acid anhydride), an N—$(C_1-C_{10})$alkenyl nitrogen-containing substituted or unsubstituted $(C_1-C_{10})$heterocycle, a salt thereof, a $(C_1-C_5)$ alkyl ester thereof, or a combination thereof. The polymer (e.g., not considering inter-particle crosslinks) can have any suitable molecular weight, such as about 100 to about 20,000,000, or about 1,000 to about 1,000,000, or about 100 or less, or about 200, 300, 500, 750, 1,000, 1,500, 2,000, 2,500, 5,000, 10,000, 15,000, 20,000, 25,000, 50,000, 75,000, 100,000, 150,000, 200,000, 250,000, 500,000, 1,000,000, 2,000,000, 5,000,000, 10,000,000, 15,000,000, or about 20,000,000 or more.

The ratio of ionic to nonionic monomers in the polymer coating can be selected to yield hydrogels with a desired charge density. In some instances, for example, it can be desirable to have hydrogels with higher charge densities in order to yield coatings with faster hydration or swelling properties. In an embodiment, the ionic content or charge density of the hydrogel polymer is in the range of 10 mol % to about 70 mol % ionic, or about 25 mol % to about 55 mol % ionic, with the balance nonionic. In other instances the ionizable monomers can be selected to have higher or lower ionization constants, such as to yield hydrogels more or less stable in brine environments The polymer can include repeating units that cause branching. For example, the polymer can include a polymer or copolymer including a monomer unit chosen from pentaerythritol triallyl ether, a polyethyleneglycol-diacrylate, polyethyleneglycol-dimethacrylate, N,N'-methylenebisacrylamide, epichlorohydrin, divinyl sulfone, glycidyl methacrylate, alkyl diacrylate, ethylene glycol diacrylate, ethylene glycol dimethacrylate, polyethylene glycol diacrylate, polyethylene glycol dimethacrylate, ethoxylated bisphenol A diacrylate, ethoxylated bisphenol A dimethacrylate, ethoxylated trimethylol propane triacrylate, ethoxylated trimethylol propane trimethacrylate, ethoxylated glyceryl triacrylate, ethoxylated glyceryl trimethacrylate, ethoxylated pentaerythritol tetraacrylate, ethoxylated pentaerythritol tetramethacrylate, ethoxylated dipentaerythritol hexaacrylate, polyglyceryl monoethylene oxide polyacrylate, polyglyceryl polyethylene glycol polyacrylate, dipentaerythritol hexaacrylate, dipentaerythritol hexamethacrylate, neopentyl glycol diacrylate, neopentyl glycol dimethacrylate, pentaerythritol triacrylate, pentaerythritol trimethacrylate, trimethylol propane triacrylate, trimethylol propane trimethacrylate, tricyclodecane dimethanol diacrylate, tricyclodecane dimethanol dimethacrylate, 1,6-hexanediol diacrylate, 1,6-hexanediol dimethacrylate, or a combination thereof.

The polymer coating can include a polyurethane or a polyurea. Suitable monomers to form polymers with polyurethane or polyurea functionalities can be polyols or polyamines, either of which can be reacted with isocyanates or isocyanurates. For example, the polyol can be a polyoxyalkylene (e.g., ethylene glycol, propylene glycol), glycerin, trimethylolpropane, 1,2,6-hexanetriol, pentaerythritol, sorbitol, sucrose, α-methylglycoside, PEG-PPG, polyols sold under the Tetronic® name, polyols sold under the Pluronic® name, and polyamines sold under the Jeffamine® name. Examples of isocyanates can include toluene diisocyanate, naphthalene diisocyanate, xylene-diisocyanate, tetramethylene diisocyanate, hexamethylene diisocyanate, trimethylene diisocyanate, trimethyl hexamethylene diisocyanate, cyclohexyl-1,2-diisocyanate, cyclohexylene-1,4-diisocyanate, and the like.

In some embodiments, the polymer coating can include a poly(vinyl alcohol) copolymer or a crosslinked poly(vinyl alcohol) copolymer including a graft, linear, branched, block, or random copolymer that includes a poly(vinyl alcohol/acrylamide) copolymer, a poly(vinyl alcohol/2-acrylamido-2-methylpropanesulfonic acid) copolymer, a poly(acrylamide/2-acrylamido-2-methylpropanesulfonic acid) copolymer, or a poly(vinylalcohol/N-vinylpyrrolidone) copolymer. In some embodiments, the polymer coating can include polyacrylamide (PA); a copolymer of acrylamide and a sulfonic acid-containing monomer (e.g., 2-acrylamido-2-methylpropanesulfonic acid or a salt or ester thereof); a copolymer of sulfonated styrene and maleic anhydride; a terpolymer of acrylamide, a sulfonic acid-containing monomer (e.g., 2-acrylamido-2-methylpropanesulfonic acid or a salt or ester thereof), a cationic acid-containing monomer (e.g., acryloyloxyethyltrimethylammonium chloride or methacrylamidopropyltrimethylammonium chloride), or a combination thereof.

In some embodiments, the polymer coating can include any suitable polymer that can be used for viscosification of an aqueous solution, such as via crosslinking of the polymer. The polymer coating can include at least one of a substituted or unsubstituted polysaccharide, and a substituted or unsubstituted polyalkene (e.g., a polyethylene, wherein the ethylene unit is substituted or unsubstituted, derived from the corresponding substituted or unsubstituted ethene), wherein the polysaccharide or polyalkene is crosslinked or uncrosslinked. The polymer coating can include a polymer including at least one repeating unit derived from a monomer selected from the group consisting of ethylene glycol, acrylamide, vinyl acetate, 2-acrylamidomethylpropane sulfonic acid or its salts, trimethylammoniumethyl acrylate halide, and trimethylammoniumethyl methacrylate halide. The polymer coating can include a crosslinked gel or a crosslinkable gel. The polymer coating can include at least one of a linear polysaccharide, and a poly(($C_2$-$C_{10}$)alkene), wherein the ($C_2$-$C_{10}$)alkene is substituted or unsubstituted. The polymer coating can include at least one of poly(acrylic acid) or ($C_1$-$C_5$)alkyl esters thereof, poly(methacrylic acid) or ($C_1$-$C_5$)alkyl esters thereof, poly(vinyl acetate), poly(vinyl alcohol), poly(ethylene glycol), poly(vinyl pyrrolidone), polyacrylamide, poly(hydroxyethyl methacrylate), alginate, chitosan, curdlan, dextran, derivatized dextran, emulsan, a galactoglucopolysaccharide, gellan, glucuronan, N-acetyl-glucosamine, N-acetyl-heparosan, hyaluronic acid, kefiran, lentinan, levan, mauran, pullulan, scleroglucan, schizophyllan, stewartan, succinoglycan, xanthan, diutan, welan, starch, derivatized starch, tamarind, tragacanth, guar gum, derivatized guar gum (e.g., hydroxypropyl guar, carboxy methyl guar, or carboxymethyl hydroxypropyl guar), gum ghatti, gum arabic, locust bean gum, karaya gum, cellulose, and derivatized cellulose (e.g., carboxymethyl cellulose, hydroxyethyl cellulose, carboxymethyl hydroxyethyl cellulose, hydroxypropyl cellulose, or methyl hydroxy ethyl cellulose).

In some embodiments, the polymer coating can include at least one of a poly(vinyl alcohol) homopolymer, poly(vinyl alcohol) copolymer, a crosslinked poly(vinyl alcohol) homopolymer, and a crosslinked poly(vinyl alcohol) copolymer. The polymer coating can include a poly(vinyl alcohol) copolymer or a crosslinked poly(vinyl alcohol) copolymer including at least one of a graft, linear, branched, block, and random copolymer of vinyl alcohol and at least one of a substituted or unsubstituted ($C_2$-$C_{50}$)hydrocarbyl having at least one aliphatic unsaturated C—C bond therein, and a substituted or unsubstituted ($C_2$-$C_{50}$)alkene. The polymer coating can include a poly(vinyl alcohol) copolymer or a crosslinked poly(vinyl alcohol) copolymer including at least one of a graft, linear, branched, block, and random copolymer of vinyl alcohol and at least one of vinyl phosphonic acid, vinylidene diphosphonic acid, substituted or unsubstituted 2-acrylamido-2-methylpropanesulfonic acid, a substituted or unsubstituted ($C_1$-$C_{20}$)alkenoic acid, propenoic acid, butenoic acid, pentenoic acid, hexenoic acid, octenoic acid, nonenoic acid, decenoic acid, acrylic acid, methacrylic acid, hydroxypropyl acrylic acid, acrylamide, fumaric acid, methacrylic acid, hydroxypropyl acrylic acid, vinyl phosphonic acid, vinylidene diphosphonic acid, itaconic acid, crotonic acid, mesoconic acid, citraconic acid, styrene sulfonic acid, allyl sulfonic acid, methallyl sulfonic acid, vinyl sulfonic acid, and a substituted or unsubstituted ($C_1$-$C_{20}$)alkyl ester thereof. The polymer coating can include a poly(vinyl alcohol) copolymer or a crosslinked poly(vinyl alcohol) copolymer including at least one of a graft, linear, branched, block, and random copolymer of vinyl alcohol and at least one of vinyl acetate, vinyl propanoate, vinyl butanoate, vinyl pentanoate, vinyl hexanoate, vinyl 2-methyl butanoate, vinyl 3-ethylpentanoate, and vinyl 3-ethylhexanoate, maleic anhydride, a substituted or unsubstituted ($C_1$-$C_{20}$)alkenoic substituted or unsubstituted ($C_1$-$C_{20}$)alkanoic anhydride, a substituted or unsubstituted ($C_1$-$C_{20}$)alkenoic substituted or unsubstituted ($C_1$-$C_{20}$)alkenoic anhydride, propenoic acid anhydride, butenoic acid anhydride, pentenoic acid anhydride, hexenoic acid anhydride, octenoic acid anhydride, nonenoic acid anhydride, decenoic acid anhydride, acrylic acid anhydride, fumaric acid anhydride, methacrylic acid anhydride, hydroxypropyl acrylic acid anhydride, vinyl phosphonic acid anhydride, vinylidene diphosphonic acid anhydride, itaconic acid anhydride, crotonic acid anhydride, mesoconic acid anhydride, citraconic acid anhydride, styrene sulfonic acid anhydride, allyl sulfonic acid anhydride, methallyl sulfonic acid anhydride, vinyl sulfonic acid anhydride, and an N—($C_1$-$C_{10}$)alkenyl nitrogen containing substituted or unsubstituted ($C_1$-$C_{10}$)heterocycle. The polymer coating can include a poly(vinyl alcohol) copolymer or a crosslinked poly(vinyl alcohol) copolymer including at least one of a graft, linear, branched, block, and random copolymer that includes a poly(vinylalcohol/acrylamide) copolymer, a poly(vinylalcohol/2-acrylamido-2-methylpropanesulfonic acid) copolymer, a poly(acrylamide/2-acrylamido-2-methylpropanesulfonic acid) copolymer, or a poly(vinylalcohol/N-vinylpyrrolidone) copolymer. The polymer coating can include a crosslinked poly(vinyl alcohol) homopolymer or copolymer including a crosslinker including at least one of chromium, aluminum, antimony, zirconium, titanium, calcium, boron, iron, silicon, copper, zinc, magnesium, and an ion thereof. The polymer coating can include a crosslinked poly(vinyl alcohol) homopolymer or copolymer including a crosslinker including at least one of an aldehyde, an aldehyde-forming compound, a carboxylic acid or an ester thereof, a sulfonic acid or an ester thereof, a phosphonic acid or an ester thereof, an acid anhydride, and an epihalohydrin.

The one or more polymers can form any suitable proportion of the total weight of the coated particles (e.g., swollen or not swollen), such as about 0.001 wt % to about 99 wt %, or about 0.1 wt % to about 80 wt %, or about 0.001 wt % or less, or about 0.01 wt %, 0.1, 1, 2, 3, 4, 5, 6, 8, 10, 15, 20, 25, 30, 35, 40, 45, 50, 55, 60, 65, 70, 75, 80, 85, 86, 88, 90, 92, 94, 95, 96, 97, 98 wt %, or about 99 wt % or more.

Inter-Particle Crosslinks.

The crosslinked composition can include inter-particle crosslinks between the polymer coatings of at least some of the proppant particles, such as wherein about 0.01 wt % to about 100 wt % of the coated proppant particles include an inter-particle crosslink to another coated proppant particle, about 0.01 wt % to about 50 wt %, about 0.01 wt % to about 25 wt %, or about 0.01 wt % or less, or equal to or greater than 0.1 wt %, 1, 2, 3, 4, 5, 10, 15, 20, 25, 30, 35, 40, 45, 50, 55, 60, 65, 70, 75, 80, 85, 90, 91, 92, 93, 94, 95, 96, 97, 98, 99, 99.9, or about 99.99 wt % or more. The inter-particle crosslinks can include a crosslinker. The inter-particle crosslinks can include one crosslinker, or more than one crosslinker. The crosslinker can be any suitable crosslinker, provided that the method can be performed as described herein.

The one or more crosslinkers can form any suitable proportion of the total weight of the crosslinked composition or pre-crosslinked composition, such as about 0.000,001 wt % to about 30 wt %, about 0.001 wt % to about 10 wt %, about 0.001 wt % to about 0.01 wt %, or about 0.000,001 wt % or less, or about 0.000.01 wt %, 0.000,1, 0.001, 0.01, 0.1, 1, 2, 3, 4, 5, 6, 8, 10, 15, 20, 25 wt %, or about 30 wt % or more.

The crosslinker can be a polymer including at least one nitrogen-containing repeating unit. The crosslinker can be at least one of a polyamine, a polyimine, a polyamide, a copolymer thereof, and a mixture thereof. The crosslinker can be a poly($C_2$-$C_{10}$)alkyleneimine, a polyalkyleneamine, a copolymer thereof, or a mixture thereof. The polyalkyleneamine can be a poly(vinylamine) (e.g., a poly(ethyleneamine)), a poly(propyleneamine), or a polyallylamine. The polyalkyleneamine can be a polymer or copolymer formed via polymerization of ethylenediamine, diethylenetriamine, triethylenetetraamine, tetraethylenepentamine, propylethylenediamine, tetrabutylenepentamine, hexaethyleneheptamine, hexapentyleneheptamine, heptaethyleneoctamine, octaethylenenonamine, nonaethylenedecamine, decaethyleneundecamine, decahexyleneundecamine, undecaethylenedodecamine, dodecaethylenetridecamine, tridecaethylenedodecamine, dodecaethylenetriamine, tridecaethylenetetradecamine, N-tallow propylenediamine, or a combination thereof.

The crosslinker can be a poly($C_2$-$C_{10}$)hydrocarbyleneimine, wherein the ($C_2$-$C_{10}$)hydrocarbylene is independently substituted or unsubstituted and is interrupted by 0, 1, 2, or 3 atoms chosen from —O—, —S—, and substituted or unsubstituted —NH—. The crosslinker can be a poly($C_2$-$C_{10}$)alkyleneimine having the following structure:

At each occurrence, $R^1$ can be independently selected from the group consisting of —H and a substituted or unsubstituted ($C_1$-$C_{30}$)hydrocarbyl. At each occurrence $R^1$ can independently be selected from the group consisting of —H and a substituted or unsubstituted ($C_1$-$C_{30}$)alkyl. At each occurrence $R^1$ can independently be selected from the group consisting of —H and a ($C_1$-$C_{10}$)alkyl. At each occurrence, $R^2$ can independently be a substituted or unsubstituted ($C_2$-$C_{10}$)hydrocarbylene. At each occurrence, $R^2$ can be independently ($C_2$-$C_{10}$)alkylene. At each occurrence, $R^2$ can be independently ($C_2$-$C_5$)alkylene. At each occurrence, $R^2$ can be ethylene. At each occurrence, $R^3$ can be independently selected from the group consisting of —H, a substituted or unsubstituted ($C_1$-$C_{30}$)hydrocarbyl, and a substituted or unsubstituted ($C_2$-$C_{10}$)hydrocarbylene terminated with —$NR^3_2$. At each occurrence, $R^3$ can be independently selected from the group consisting of —H, a substituted or unsubstituted ($C_1$-$C_{30}$)alkyl, and a substituted or unsubstituted —($C_2$-$C_{10}$)alkylene-$NR^3_2$. At each occurrence, $R^3$ can be independently selected from the group consisting of —H, ($C_1$-$C_{10}$)alkyl, and a —($C_2$-$C_{10}$)alkylene-$NR^3_2$. At each occurrence, $R^3$ can be independently selected from the group consisting of —H, and —$(CH_2)_2$—$NR^3_2$. The variable m1 can be about 0 to about 100,000, about 1 to about 100, or about 0, 1, 2, 3, 4, 5, 6, 8, 10, 12, 14, 16, 18, 20, 22, 24, 26, 28, 30, 35, 40, 45, 50, 60, 70, 80, 90, 100, 125, 150, 175, 200, 250, 500, 750, 1,000, 1,500, 2,000, 5,000, 10,000, 20,000, 50,000, 75,000, or about 100,000 or more. In some embodiments, the crosslinker can be polyethyleneimine (PEI).

In embodiments wherein the polymer coating includes a polymer that can be used for viscosification of an aqueous solution, the crosslinker can include any suitable material that can crosslink the viscosifier-type polymer. For example, the crosslinker can include at least one of chromium, aluminum, antimony, zirconium, titanium, calcium, boron, iron, silicon, copper, zinc, magnesium, and an ion thereof. The crosslinker can include at least one of boric acid, borax, a borate, a ($C_1$-$C_{30}$)hydrocarbylboronic acid, a ($C_1$-$C_{30}$)hydrocarbyl ester of a ($C_1$-$C_{30}$)hydrocarbylboronic acid, a ($C_1$-$C_{30}$)hydrocarbylboronic acid-modified polyacrylamide, ferric chloride, disodium octaborate tetrahydrate, sodium metaborate, sodium diborate, sodium tetraborate, disodium tetraborate, a pentaborate, ulexite, colemanite, magnesium oxide, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, zirconium lactate glycolate, titanium lactate, titanium malate, titanium citrate, titanium ammonium lactate, titanium triethanolamine, titanium acetylacetonate, aluminum lactate, and aluminum citrate. In some embodiments, the crosslinker can be a ($C_1$-$C_{20}$)alkylenebiacrylamide (e.g., methylenebisacrylamide), a poly(($C_1$-$C_{20}$)alkenyl)-substituted mono- or poly-($C_1$-$C_{20}$) alkyl ether (e.g., pentaerythritol allyl ether), and a poly($C_2$-$C_{20}$)alkenylbenzene (e.g., divinylbenzene). In some embodiments, the crosslinker can be at least one of alkyl diacrylate, ethylene glycol diacrylate, ethylene glycol dimethacrylate, polyethylene glycol diacrylate, polyethylene glycol dimethacrylate, ethoxylated bisphenol A diacrylate, ethoxylated bisphenol A dimethacrylate, ethoxylated trimethylol propane triacrylate, ethoxylated trimethylol propane trimethacrylate, ethoxylated glyceryl triacrylate, ethoxylated glyceryl trimethacrylate, ethoxylated pentaerythritol tetraacrylate, ethoxylated pentaerythritol tetramethacrylate, ethoxylated dipentaerythritol hexaacrylate, polyglyceryl monoethylene oxide polyacrylate, polyglyceryl polyethylene glycol polyacrylate, dipentaerythritol hexaacrylate, dipentaerythritol hexamethacrylate, neopentyl glycol diacrylate, neopentyl glycol dimethacrylate, pentaerythritol triacrylate, pentaerythritol trimethacrylate, trimethylol propane triacrylate, trimethylol propane trimethacrylate, tricyclodecane dimethanol diacrylate, tricyclodecane dimethanol dimethacrylate, 1,6-hexanediol diacrylate, and 1,6-hexanediol dimethacrylate.

Crosslinking Accelerant.

In various embodiments, the crosslinked composition or the pre-crosslinked composition further includes a crosslinking accelerant. The crosslinking accelerant can be any suitable one or more materials that increases the kinetics of crosslinking. The crosslinking accelerant can be a pH control compound (e.g., a compound that affects the pH of the surrounding solution). The crosslinking accelerant can be an acid, a base, a salt thereof, or a combination thereof. The crosslinking accelerant can be an alkali metal carbonate, an alkali metal bicarbonate, an alkali metal acetate, an alkali metal formate, an alkali metal hydroxide, a Lewis acid (e.g., boric acid), a mineral acid (e.g., HCl), an organic acid (e.g., a phenol, or acetic acid), or a combination thereof. The crosslinking agent can be ammonium chloride, urea, lactose, or a combination thereof. The crosslinking accelerant can be boric acid. The one or more crosslinking accelerants can be any suitable proportion of the crosslinked composition or the pre-crosslinked composition, such as about 0.001 wt % to about 10 wt %, or about 0.01 wt % to about 0.5 wt %, or about 0.001 wt % or less, or about 0.005 wt %, 0.01, 0.05, 0.1, 0.5, 1, 2, 3, 4, 5, 6, 7, 8, 9, or about 10 wt % or more.

Other Components.

The crosslinked composition, pre-crosslinked composition, or a mixture including one of the same can include any suitable additional component in any suitable proportion, such that the crosslinked composition, pre-crosslinked composition, or mixture including the same can be used as described herein. Any component listed in this section can be present or not present in the composition or a mixture including the same.

In some embodiments, the crosslinked composition, pre-crosslinked composition, or a mixture including one of same includes one or more viscosifiers. The viscosifier can be any suitable viscosifier. The viscosifier can affect the viscosity of the crosslinked composition, pre-crosslinked composition, or a mixture including one of the same, at any suitable time and location. In some embodiments, the viscosifier provides an increased viscosity at least one of before injection into the subterranean formation, at the time of injection into the subterranean formation, during travel through a tubular disposed in a borehole, once reaching a particular subterranean location, or some period of time after reaching a particular subterranean location. In some embodiments, the viscosifier can be about 0.000.1 wt % to about 10 wt % of the crosslinked composition, pre-crosslinked composition, or a mixture including one of the same, about 0.004 wt % to about 0.01 wt %, or about 0.000.1 wt % or less, 0.000.5 wt %, 0.001, 0.005, 0.01, 0.05, 0.1, 0.5, 1, 2, 3, 4, 5, 6, 7, 8, 9, or about 10 wt % or more.

The viscosifier can include at least one of a substituted or unsubstituted polysaccharide, and a substituted or unsubstituted polyalkene (e.g., a polyethylene, wherein the ethylene unit is substituted or unsubstituted, derived from the corresponding substituted or unsubstituted ethene), wherein the polysaccharide or polyalkene is crosslinked or uncrosslinked. The viscosifier can include a polymer including at least one repeating unit derived from a monomer selected from the group consisting of ethylene glycol, acrylamide, vinyl acetate, 2-acrylamidomethylpropane sulfonic acid or its salts, trimethylammoniummethyl acrylate halide, and trimethylammoniummethyl methacrylate halide. The viscosifier can include a crosslinked gel or a crosslinkable gel. The viscosifier can include at least one of a linear polysaccharide, and a poly(($C_2$-$C_{10}$)alkene), wherein the ($C_2$-$C_{10}$) alkene is substituted or unsubstituted. The viscosifier can include at least one of poly(acrylic acid) or ($C_1$-$C_5$)alkyl esters thereof, poly(methacrylic acid) or ($C_1$-$C_5$)alkyl esters thereof, poly(vinyl acetate), poly(vinyl alcohol), poly(ethylene glycol), poly(vinyl pyrrolidone), polyacrylamide, poly(hydroxyethyl methacrylate), alginate, chitosan, curdlan, dextran, derivatized dextran, emulsan, a galactoglucopolysaccharide, gellan, glucuronan, N-acetyl-glucosamine, N-acetyl-heparosan, hyaluronic acid, kefiran, lentinan, levan, mauran, pullulan, scleroglucan, schizophyllan, stewartan, succinoglycan, xanthan, diutan, welan, starch, derivatized starch, tamarind, tragacanth, guar gum, derivatized guar gum (e.g., hydroxypropyl guar, carboxy methyl guar, or carboxymethyl hydroxypropyl guar), gum ghatti, gum arabic, locust bean gum, karaya gum, cellulose, and derivatized cellulose (e.g., carboxymethyl cellulose, hydroxyethyl cellulose, carboxymethyl hydroxyethyl cellulose, hydroxypropyl cellulose, or methyl hydroxy ethyl cellulose).

In some embodiments, the viscosifier can include at least one of a poly(vinyl alcohol) homopolymer, poly(vinyl alcohol) copolymer, a crosslinked poly(vinyl alcohol) homopolymer, and a crosslinked poly(vinyl alcohol) copolymer. The viscosifier can include a poly(vinyl alcohol) copolymer or a crosslinked poly(vinyl alcohol) copolymer including at least one of a graft, linear, branched, block, and random copolymer of vinyl alcohol and at least one of a substituted or unsubstituted ($C_2$-$C_{50}$)hydrocarbyl having at least one aliphatic unsaturated C—C bond therein, and a substituted or unsubstituted ($C_2$-$C_{50}$)alkene. The viscosifier can include a poly(vinyl alcohol) copolymer or a crosslinked poly(vinyl alcohol) copolymer including at least one of a graft, linear, branched, block, and random copolymer of vinyl alcohol and at least one of vinyl phosphonic acid, vinylidene diphosphonic acid, substituted or unsubstituted 2-acrylamido-2-methylpropanesulfonic acid, a substituted or unsubstituted ($C_1$-$C_{20}$)alkenoic acid, propenoic acid, butenoic acid, pentenoic acid, hexenoic acid, octenoic acid, nonenoic acid, decenoic acid, acrylic acid, methacrylic acid, hydroxypropyl acrylic acid, acrylamide, fumaric acid, methacrylic acid, hydroxypropyl acrylic acid, vinyl phosphonic acid, vinylidene diphosphonic acid, itaconic acid, crotonic acid, mesoconic acid, citraconic acid, styrene sulfonic acid, allyl sulfonic acid, methallyl sulfonic acid, vinyl sulfonic acid, and a substituted or unsubstituted ($C_1$-$C_{20}$)alkyl ester thereof. The viscosifier can include a poly(vinyl alcohol) copolymer or a crosslinked poly(vinyl alcohol) copolymer including at least one of a graft, linear, branched, block, and random copolymer of vinyl alcohol and at least one of vinyl acetate, vinyl propanoate, vinyl butanoate, vinyl pentanoate, vinyl hexanoate, vinyl 2-methyl butanoate, vinyl 3-ethylpentanoate, and vinyl 3-ethylhexanoate, maleic anhydride, a substituted or unsubstituted ($C_1$-$C_{20}$)alkenoic substituted or unsubstituted ($C_1$-$C_{20}$)alkanoic anhydride, a substituted or unsubstituted ($C_1$-$C_{20}$)alkenoic substituted or unsubstituted ($C_1$-$C_{20}$)alkenoic anhydride, propenoic acid anhydride, butenoic acid anhydride, pentenoic acid anhydride, hexenoic acid anhydride, octenoic acid anhydride, nonenoic acid anhydride, decenoic acid anhydride, acrylic acid anhydride, fumaric acid anhydride, methacrylic acid anhydride, hydroxypropyl acrylic acid anhydride, vinyl phosphonic acid anhydride, vinylidene diphosphonic acid anhydride, itaconic acid anhydride, crotonic acid anhydride, mesoconic acid anhydride, citraconic acid anhydride, styrene sulfonic acid anhydride, allyl sulfonic acid anhydride, methallyl sulfonic acid anhydride, vinyl sulfonic acid anhydride, and an N—($C_1$-$C_{10}$)alkenyl nitrogen containing substituted or unsubstituted ($C_1$-$C_{10}$)heterocycle. The viscosifier can include a poly(vinyl alcohol) copolymer or a crosslinked poly(vinyl alcohol) copolymer including at least one of a graft, linear, branched, block, and random copolymer that includes a poly(vinylalcohol/acrylamide) copolymer, a poly(vinylalcohol/2-acrylamido-2-methylpropanesulfonic acid) copolymer, a poly (acrylamide/2-acrylamido-2-methylpropanesulfonic acid) copolymer, or a poly(vinylalcohol/N-vinylpyrrolidone) copolymer. The viscosifier can include a crosslinked poly(vinyl alcohol) homopolymer or copolymer including a crosslinker including at least one of chromium, aluminum, antimony, zirconium, titanium, calcium, boron, iron, silicon, copper, zinc, magnesium, and an ion thereof. The viscosifier can include a crosslinked poly(vinyl alcohol) homopolymer or copolymer including a crosslinker including at least one of an aldehyde, an aldehyde-forming compound, a carboxylic acid or an ester thereof, a sulfonic acid or an ester thereof, a phosphonic acid or an ester thereof, an acid anhydride, and an epihalohydrin.

In various embodiments, the crosslinked composition, pre-crosslinked composition, or a mixture including one of the same can include one or more crosslinkers. The crosslinker can be any suitable crosslinker. In some examples, the crosslinker can be incorporated in a crosslinked viscosifier, and in other examples, the crosslinker can crosslink a crosslinkable material (e.g., downhole). The crosslinker can include at least one of chromium, aluminum, antimony, zirconium, titanium, calcium, boron, iron, silicon, copper, zinc, magnesium, and an ion thereof. The crosslinker can include at least one of boric acid, borax, a borate, a ($C_1$-$C_{30}$)hydrocarbylboronic acid, a ($C_1$-$C_{30}$)hydrocarbyl ester of a ($C_1$-$C_{30}$)hydrocarbylboronic acid, a ($C_1$-$C_{30}$)hydrocarbylboronic acid-modified polyacrylamide, ferric chloride, disodium octaborate tetrahydrate, sodium metaborate, sodium diborate, sodium tetraborate, disodium tetraborate, a pentaborate, ulexite, colemanite, magnesium oxide, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, zirconium lactate glycolate, titanium lactate, titanium malate, titanium citrate, titanium ammonium lactate, titanium triethanolamine, titanium acetylacetonate, aluminum lactate, and aluminum citrate. In some embodiments, the crosslinker can be a ($C_1$-$C_{20}$)alkylenebiacrylamide (e.g., methylenebisacrylamide), a poly (($C_1$-$C_{20}$)alkenyl)-substituted mono- or poly-($C_1$-$C_{20}$)alkyl ether (e.g., pentaerythritol allyl ether), and a poly($C_2$-$C_{20}$) alkenylbenzene (e.g., divinylbenzene). In some embodiments, the crosslinker can be at least one of alkyl diacrylate, ethylene glycol diacrylate, ethylene glycol dimethacrylate, polyethylene glycol diacrylate, polyethylene glycol dimethacrylate, ethoxylated bisphenol A diacrylate, ethoxylated bisphenol A dimethacrylate, ethoxylated trimethylol propane triacrylate, ethoxylated trimethylol propane trimethacrylate, ethoxylated glyceryl triacrylate, ethoxylated glyceryl trimethacrylate, ethoxylated pentaerythritol tetraacrylate, ethoxylated pentaerythritol tetramethacrylate, ethoxylated dipentaerythritol hexaacrylate, polyglyceryl monoethylene oxide polyacrylate, polyglyceryl polyethylene glycol polyacrylate, dipentaerythritol hexaacrylate, dipentaerythritol hexamethacrylate, neopentyl glycol diacrylate, neopentyl glycol dimethacrylate, pentaerythritol triacrylate, pentaerythritol trimethacrylate, trimethylol propane triacrylate, trimethylol propane trimethacrylate, tricyclodecane dimethanol diacrylate, tricyclodecane dimethanol dimethacrylate, 1,6-hexanediol diacrylate, and 1,6-hexanediol dimethacrylate. The crosslinker can be about 0.000.01 wt % to about 5 wt % of the crosslinked composition, pre-crosslinked composition, or a mixture including one of the same, about 0.001 wt % to about 0.01 wt %, or about 0.000.01 wt % or less, or about 0.000.05 wt %, 0.000,1, 0.000,5, 0.001, 0.005, 0.01, 0.05, 0.1, 0.5, 1, 2, 3, 4, or about 5 wt % or more.

In some embodiments, the crosslinked composition, pre-crosslinked composition, or a mixture including one of the same can include one or more breakers. The breaker can be any suitable breaker, such that the surrounding fluid (e.g., a fracturing fluid) can be at least partially broken for more complete and more efficient recovery thereof, such as at the conclusion of the hydraulic fracturing treatment. In some embodiments, the breaker can be encapsulated or otherwise formulated to give a delayed-release or a time-release of the breaker, such that the surrounding liquid can remain viscous for a suitable amount of time prior to breaking. The breaker can be any suitable breaker; for example, the breaker can be a compound that includes at least one of a $Na^+$, $K^+$, $Li^+$, $Zn^+$, $NH_4^+$, $Fe^{2+}$, $Fe^{3+}$, $Cu^{2+}$, $cu^{2+}$, $Ca^{2+}$, $Mg^{2+}$, $zn^{2+}$, and an $Al^{3+}$ salt of a chloride, fluoride, bromide, phosphate, or sulfate ion. In some examples, the breaker can be an oxidative breaker or an enzymatic breaker. An oxidative breaker can be at least one of a $Na^+$, $K^+$, $Li^+$, $Zn^+$, $NH_4^+$, $Fe^{2+}$, $Fe^{3+}$, $Cu^{1+}$, $Cu^{2+}$, $Ca^{2+}$, $Mg^{2+}$, $zn^{2+}$, and an $Al^{3+}$ salt of a persulfate, percarbonate, perborate, peroxide, perphosphate, permanganate, chlorite, or hypochlorite ion. An enzymatic breaker can be at least one of an alpha or beta amylase, amyloglucosidase, oligoglucosidase, invertase, maltase, cellulase, hemi-cellulase, and mannanohydrolase. The breaker can be about 0.001 wt % to about 30 wt % of the crosslinked composition, pre-crosslinked composition, or a mixture including one of the same, or about 0.01 wt % to about 5 wt %, or about 0.001 wt % or less, or about 0.005 wt %, 0.01, 0.05, 0.1, 0.5, 1, 2, 3, 4, 5, 6, 8, 10, 12, 14, 16, 18, 20, 22, 24, 26, 28, or about 30 wt % or more.

The crosslinked composition, pre-crosslinked composition, or a mixture including one of the same can include any suitable fluid. For example, the fluid can be at least one of crude oil, dipropylene glycol methyl ether, dipropylene glycol dimethyl ether, dipropylene glycol methyl ether, dipropylene glycol dimethyl ether, dimethyl formamide, diethylene glycol methyl ether, ethylene glycol butyl ether, diethylene glycol butyl ether, butylglycidyl ether, propylene carbonate, D-limonene, a $C_2$-$C_{40}$ fatty acid $C_1$-$C_{10}$ alkyl ester (e.g., a fatty acid methyl ester), tetrahydrofurfuryl methacrylate, tetrahydrofurfuryl acrylate, 2-butoxy ethanol, butyl acetate, butyl lactate, furfuryl acetate, dimethyl sulfoxide, dimethyl formamide, a petroleum distillation product of fraction (e.g., diesel, kerosene, napthas, and the like) mineral oil, a hydrocarbon oil, a hydrocarbon including an aromatic carbon-carbon bond (e.g., benzene, toluene), a hydrocarbon including an alpha olefin, xylenes, an ionic liquid, methyl ethyl ketone, an ester of oxalic, maleic or succinic acid, methanol, ethanol, propanol (iso- or normal-), butyl alcohol (iso-, tert-, or normal-), an aliphatic hydrocarbon (e.g., cyclohexanone, hexane), water, brine, produced water, flowback water, brackish water, and sea water. The fluid can form about 0.001 wt % to about 99.999 wt % of the crosslinked composition, pre-crosslinked composition, or a mixture including one of the same, or about 0.001 wt % or less, 0.01 wt %, 0.1, 1, 2, 3, 4, 5, 6, 8, 10, 15, 20, 25, 30, 35, 40, 45, 50, 55, 60, 65, 70, 75, 80, 85, 90, 95, 96, 97, 98, 99, 99.9, 99.99, or about 99.999 wt % or more.

The crosslinked composition, pre-crosslinked composition, or a mixture including one of the same can include any suitable downhole fluid. The crosslinked composition, pre-crosslinked composition, or a mixture including one of the same can be combined with any suitable downhole fluid before, during, or after the placement of the composition in the subterranean formation or the contacting of the composition and the subterranean material. In some examples, the crosslinked composition, pre-crosslinked composition, or a mixture including one of the same is combined with a downhole fluid above the surface, and then the combined composition is placed in a subterranean formation or contacted with a subterranean material. In another example, the crosslinked composition, pre-crosslinked composition, or a mixture including one of the same is injected into a subterranean formation to combine with a downhole fluid, and the combined composition is contacted with a subterranean material or is considered to be placed in the subterranean formation. The placement in the subterranean formation can include contacting the subterranean material and the mixture. Any suitable weight percent of the crosslinked composition, pre-crosslinked composition, or a mixture including one of the same that is placed in the subterranean formation or contacted with the subterranean material can be the downhole fluid, such as about 0.001 wt % to about 99.999 wt %, about 0.01 wt % to about 99.99 wt %, about 0.1 wt % to about 99.9 wt %, about 20 wt % to about 90 wt %, or about 0.001 wt % or less, or about 0.01 wt %, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99 wt %, or about 99.999 wt %.

In some embodiments, the crosslinked composition, pre-crosslinked composition, or a mixture including one of the same can include any suitable amount of any suitable material used in a downhole fluid. For example, the crosslinked composition, pre-crosslinked composition, or a mixture including one of the same can include water, saline, aqueous base, acid, oil, organic solvent, synthetic fluid oil phase, aqueous solution, alcohol or polyol, cellulose, starch, alkalinity control agents, acidity control agents, density control agents, density modifiers, emulsifiers, dispersants, polymeric stabilizers, polyacrylamide, a polymer or combination of polymers, antioxidants, heat stabilizers, foam control agents, solvents, diluents, plasticizer, filler or inorganic particle, pigment, dye, precipitating agent, oil-wetting agents, set retarding additives, surfactants, gases, weight reducing additives, heavy-weight additives, lost circulation materials, filtration control additives, salts (e.g., any suitable salt, such as potassium salts such as potassium chloride, potassium bromide, potassium formate; calcium salts such as calcium chloride, calcium bromide, calcium formate; cesium salts such as cesium chloride, cesium bromide, cesium formate, or a combination thereof), fibers, thixotropic additives, breakers, crosslinkers, rheology modifiers, curing accelerators, curing retarders, pH modifiers, chelating agents, scale inhibitors, enzymes, resins, water control materials, oxidizers, markers, Portland cement, pozzolana cement, gypsum cement, high alumina content cement, slag cement, silica cement, fly ash, metakaolin, shale, zeolite, a crystalline silica compound, amorphous silica, hydratable clays, microspheres, lime, or a combination thereof. Any suitable proportion of the crosslinked composition, pre-crosslinked composition, or a mixture including one of the same, can include any optional component listed in this paragraph, such as about 0.001 wt % to about 99.999 wt %, about 0.01 wt % to about 99.99 wt %, about 0.1 wt % to about 99.9 wt %, about 20 to about 90 wt %, or about 0.001 wt % or less, or about 0.01 wt %, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99 wt %, or about 99.999 wt % or more.

System or Apparatus.

In various embodiments, the present invention provides a system. The system can be any suitable system that can use or that can be generated by use of an embodiment of the crosslinked composition or pre-crosslinked composition described herein in a subterranean formation, or that can perform or be generated by performance of a method for using the crosslinked composition or pre-crosslinked composition described herein. The system can include the crosslinked composition. The system can also include a subterranean formation including the composition therein. In some embodiments, the composition in the system can also include a downhole fluid, or the system can include a mixture of the crosslinked composition and downhole fluid.

In some embodiments, the present invention provides a system including a tubular disposed in a subterranean formation. The system can include a pump configured to pump a pre-crosslinked composition, or a crosslinked product thereof, in the subterranean formation through the tubular. The crosslinked product of the pre-crosslinked composition (e.g., the crosslinked composition) can include proppant particles including polymer coatings thereon. The crosslinked product also includes inter-particle crosslinks between the polymer coatings of at least some of the proppant particles, the inter-particle crosslinks including a crosslinker.

Various embodiments provide systems and apparatus configured for delivering the pre-crosslinked composition or crosslinked composition described herein to a subterranean location and for using the composition therein, such as for a fracturing operation (e.g., pre-pad, pad, slurry, or finishing stages), a diversion operation, or a conformance operation. In various embodiments, the system or apparatus can include a pump fluidly coupled to a tubular (e.g., any suitable type of oilfield pipe, such as pipeline, drill pipe, production tubing, and the like), with the tubular containing an embodiment of the pre-crosslinked composition or crosslinked composition described herein.

The pump can be a high pressure pump in some embodiments. As used herein, the term "high pressure pump" will refer to a pump that is capable of delivering a fluid to a subterranean formation (e.g., downhole) at a pressure of about 1000 psi or greater. A high pressure pump can be used when it is desired to introduce the pre-crosslinked composition or crosslinked composition to a subterranean formation at or above a fracture gradient of the subterranean formation, but it can also be used in cases where fracturing is not desired. In some embodiments, the high pressure pump can be capable of fluidly conveying particulate matter, such as proppant particulates, into the subterranean formation. Suitable high pressure pumps will be known to one having ordinary skill in the art and can include floating piston pumps and positive displacement pumps.

In other embodiments, the pump can be a low pressure pump. As used herein, the term "low pressure pump" will refer to a pump that operates at a pressure of about 1000 psi or less. In some embodiments, a low pressure pump can be fluidly coupled to a high pressure pump that is fluidly coupled to the tubular. That is, in such embodiments, the low pressure pump can be configured to convey the pre-crosslinked composition or crosslinked composition to the high pressure pump. In such embodiments, the low pressure pump can "step up" the pressure of the composition before it reaches the high pressure pump.

In some embodiments, the systems or apparatuses described herein can further include a mixing tank that is upstream of the pump and in which the pre-crosslinked composition or crosslinked composition is formulated. In various embodiments, the pump (e.g., a low pressure pump, a high pressure pump, or a combination thereof) can convey the composition from the mixing tank or other source of the composition to the tubular. In other embodiments, however, the pre-crosslinked composition or crosslinked can be formulated offsite and transported to a worksite, in which case the composition can be introduced to the tubular via the pump directly from its shipping container (e.g., a truck, a railcar, a barge, or the like) or from a transport pipeline. In either case, the composition can be drawn into the pump, elevated to an appropriate pressure, and then introduced into the tubular for delivery to the subterranean formation.

Figure 2:
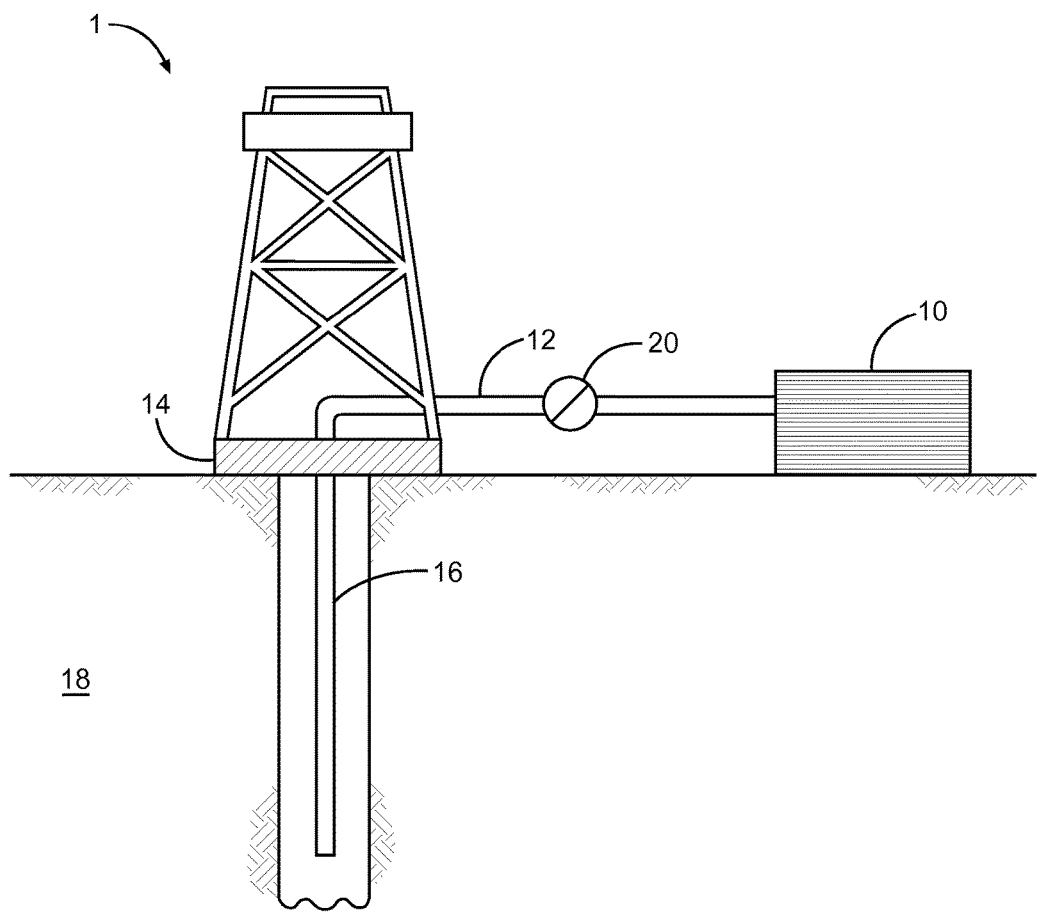
FIG. 2 illustrates a system or apparatus for delivering a composition to a subterranean formation, in accordance with various embodiments.

FIG. 2 shows an illustrative schematic of systems and apparatuses that can deliver embodiments of the compositions of the present invention to a subterranean location, according to one or more embodiments. It should be noted that while FIG. 2 generally depicts a land-based system or apparatus, it is to be recognized that like systems and apparatuses can be operated in subsea locations as well. Embodiments of the present invention can have a different scale than that depicted in FIG. 2. As depicted in FIG. 2, system or apparatus 1 can include mixing tank 10, in which an embodiment of the pre-crosslinked composition or crosslinked composition can be formulated. The composition can be conveyed via line 12 to wellhead 14, where the composition enters tubular 16, with tubular 16 extending from wellhead 14 into subterranean formation 18. Upon being ejected from tubular 16, the pre-crosslinked composition or crosslinked composition can subsequently penetrate into subterranean formation 18. Pump 20 can be configured to raise the pressure of the composition to a desired degree before its introduction into tubular 16. It is to be recognized that system or apparatus 1 is merely exemplary in nature and various additional components can be present that have not necessarily been depicted in FIG. 2 in the interest of clarity. In some examples, additional components that can be present include supply hoppers, valves, condensers, adapters, joints, gauges, sensors, compressors, pressure controllers, pressure sensors, flow rate controllers, flow rate sensors, temperature sensors, and the like.

Although not depicted in FIG. 2, at least part of the pre-crosslinked composition or crosslinked composition can, in some embodiments, flow back to wellhead 14 and exit subterranean formation 18. The composition that flows back can be substantially diminished in the concentration of the coated proppant particles therein, or can have no coated proppant particles therein. In some embodiments, the composition that has flowed back to wellhead 14 can subsequently be recovered, and in some examples reformulated, and recirculated to subterranean formation 18.

It is also to be recognized that the disclosed pre-crosslinked composition or crosslinked composition can also directly or indirectly affect the various downhole or subterranean equipment and tools that can come into contact with the composition during operation. Such equipment and tools can include wellbore casing, wellbore liner, completion string, insert strings, coiled tubing, slickline, wireline, mud motors, downhole motors and/or pumps, surface-mounted motors and/or pumps, centralizers, turbolizers, scratchers, floats (e.g., shoes, collars, valves, and the like), logging tools and related telemetry equipment, actuators (e.g., electromechanical devices, hydromechanical devices, and the like), sliding sleeves, production sleeves, plugs, screens, filters, flow control devices (e.g., inflow control devices, autonomous inflow control devices, outflow control devices, and the like), couplings (e.g., electro-hydraulic wet connect, dry connect, inductive coupler, and the like), control lines (e.g., electrical, fiber optic, hydraulic, and the like), surveillance lines, sensors or distributed sensors, downhole heat exchangers, valves and corresponding actuation devices, tool seals, packers, cement plugs, bridge plugs, and other wellbore isolation devices or components, and the like. Any of these components can be included in the systems and apparatuses generally described above and depicted in FIG. 2.

Composition for Treatment of a Subterranean Formation.

Various embodiments provide a composition for treatment of a subterranean formation. The composition can be any suitable composition that can be used to perform an embodiment of the method for treatment of a subterranean formation described herein. The composition can be an embodiment of the pre-crosslinked composition or the cross-linked composition.

In various embodiments, the present invention provides a pre-crosslinked composition for treatment of a subterranean formation. The pre-crosslinked composition can include proppant particles including polymer coatings thereon. The pre-crosslinked composition can include a crosslinker effective for forming inter-particle crosslinks between the polymer coatings of at least some of the proppant particles. In some embodiment, the present invention provides a crosslinked product of the pre-crosslinked composition.

In various embodiments, the present invention provides a crosslinked composition for treatment of a subterranean formation. The crosslinked composition can include proppant particles including polymer coatings thereon. The crosslinked composition can include inter-particle crosslinks between the polymer coatings of at least some of the proppant particles, the inter-particle crosslinks including a crosslinker.

Method for Preparing a Composition for Treatment of a Subterranean Formation.

In various embodiments, the present invention provides a method for preparing a composition for treatment of a subterranean formation. The method can be any suitable method that produces a pre-crosslinked composition or crosslinked composition described herein. For example, the method can include forming a pre-crosslinked composition or a crosslinked product thereof. The pre-crosslinked composition can include proppant particles including polymer coatings thereon. The pre-crosslinked composition can include a crosslinker effective for forming inter-particle crosslinks between the polymer coatings of at least some of the proppant particles. In various embodiments, the method further includes crosslinking the pre-crosslinked composition to form a crosslinked composition.

EXAMPLES

Various embodiments of the present invention can be better understood by reference to the following Examples which are offered by way of illustration. The present invention is not limited to the Examples given herein.

Example 1

Figure 3A:
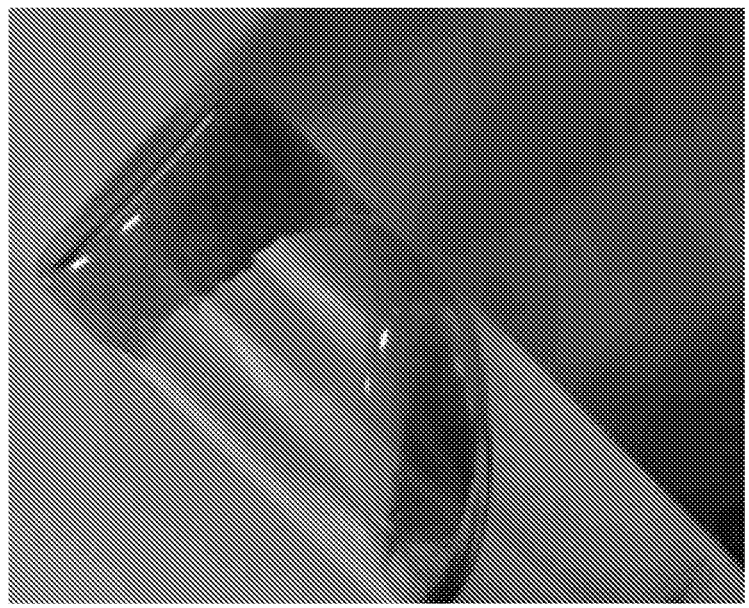
FIG. 3A illustrates coated crosslinked proppant, in accordance with various embodiments.
Figure 3B:
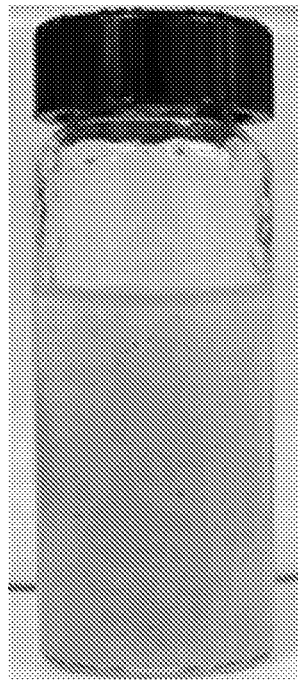
FIG. 3B illustrates a suspension of coated proppant, in accordance with various embodiments.

Crosslinked coated particles were formed using sand coated with the following: a) an aminosilane (60-80% active (w/w), N-(2-aminoethyl)-3-(trimethoxysilyl)propylamine); b) a hydrogel polymer (20% active (i.e., 20% (w/w) polyacrylamide, having average molecular weight of about 500,000); c) crosslinker (33% active (i.e., 33% (w/w) polyethyleneimine in water) hyperbranched polyethyleneimine having average molecular weight of about 200,000), and boric acid as a gelation accelerant. The hydratable coated sand was prepared via first adsorbing and curing (200° F. for 10 minutes) the aminosilane to the sand particles. Next, a solution of hydrogel polymer in water was added to the dry bed of aminosilane-coated sand and this mixture was heated to 200° F. for 12-16 h with agitation; during this time all of the water was driven off. Subsequently, the coated sand was added to water in a concentration of 3 lb/gal, with mixing. After about 5 minutes, the hydrogel had swollen with water, and the crosslinker was added in a concentration of 10 gal/Mgal, with mixing. After a few minutes, the boric acid was added in a concentration of 0.1 wt %, with mixing. After about 2 minutes at room temperature, the crosslinking was substantially complete. The crosslinked coated particles are shown in FIG. 3A, in tap water. FIG. 3B illustrates a suspension of hydrogel coated sand in tap water.

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present invention. Thus, it should be understood that although the present invention has been specifically disclosed by specific embodiments and optional features, modification and variation of the concepts herein disclosed may be resorted to by those of ordinary skill in the art, and that such modifications and variations are considered to be within the scope of embodiments of the present invention.

Additional Embodiments

The following exemplary embodiments are provided, the numbering of which is not to be construed as designating levels of importance:

Embodiment 1 provides a method of treating a subterranean formation, the method comprising:
placing in the subterranean formation a crosslinked composition comprising
proppant particles comprising polymer coatings thereon; and
inter-particle crosslinks between the polymer coatings of at least some of the proppant particles, the inter-particle crosslinks comprising a crosslinker.

Embodiment 2 provides the method of Embodiment 1, wherein the method further comprises obtaining or providing the crosslinked composition, wherein the obtaining or providing of the composition occurs above-surface.

Embodiment 3 provides the method of any one of Embodiments 1-2, wherein the method further comprises obtaining or providing the crosslinked composition, wherein the obtaining or providing of the composition occurs in the subterranean formation.

Embodiment 4 provides the method of any one of Embodiments 1-3, further comprising crosslinking a pre-crosslinked composition comprising the crosslinker and the proppant particles comprising the polymer coating thereon, to form the crosslinked composition.

Embodiment 5 provides the method of Embodiment 4, wherein the crosslinking occurs above-surface.

Embodiment 6 provides the method of Embodiment 5, wherein the method comprises:
crosslinking the pre-crosslinked composition, to form the crosslinked composition; and
placing the crosslinked composition in the subterranean formation.

Embodiment 7 provides the method of any one of Embodiments 4-6, wherein the crosslinking occurs in the subterranean formation.

Embodiment 8 provides the method of Embodiment 7, wherein the method comprises:
placing the pre-crosslinked composition in the subterranean formation; and
crosslinking the pre-crosslinked composition, to form the crosslinked composition.

Embodiment 9 provides the method of any one of Embodiments 1-8, wherein the method comprises a method of fracturing, a method of placing the proppant particles in a fracture, a method of diversion, a method of conformance, or a combination thereof.

Embodiment 10 provides the method of any one of Embodiments 1-9, wherein the method comprises fracturing the subterranean formation to form at least one subterranean fracture.

Embodiment 11 provides the method of any one of Embodiments 1-10, wherein the method comprises placing the crosslinked composition in at least one fracture in the subterranean formation.

Embodiment 12 provides the method of any one of Embodiments 1-11, wherein the coated proppant particles are about 0.01 wt % to about 99 wt % of the crosslinked composition.

Embodiment 13 provides the method of any one of Embodiments 1-12, wherein the coated proppant particles are about 0.01 wt % to about 50 wt % of the crosslinked composition.

Embodiment 14 provides the method of any one of Embodiments 1-13, wherein the polymer coating covers about 1% to about 100% of the surface area of the proppant particles.

Embodiment 15 provides the method of any one of Embodiments 1-14, wherein the polymer coating covers about 80% to about 100% of the surface area of the proppant particles.

Embodiment 16 provides the method of any one of Embodiments 1-15, wherein the polymer coating is a water-swollen polymer coating.

Embodiment 17 provides the method of any one of Embodiments 1-16, wherein the polymer coating comprises about 0.01 wt % to about 99.99 wt % water.

Embodiment 18 provides the method of any one of Embodiments 1-17, wherein the polymer coating comprises about 50 wt % to about 99.99 wt % water.

Embodiment 19 provides the method of any one of Embodiments 1-18, wherein the polymer coating is about 0.01 microns to about 5000 microns thick.

Embodiment 20 provides the method of any one of Embodiments 1-19, wherein the polymer coating is about 0.1 micron to about 1000 microns thick.

Embodiment 21 provides the method of any one of Embodiments 1-20, wherein the polymer coating is a hydrogel.

Embodiment 22 provides the method of any one of Embodiments 1-21, wherein the polymer coating comprises a polymer or copolymer comprising a monomer unit chosen from acrylic acid, methacrylic acid, acrylamide, methacrylamide, carboxyethylacrylate, hydroxyethylmethacrylate (HEMA), hydroxyethylacrylate (HEA), polyethyleneglycol acrylates, N-isopropylacrylamide (NiPA), 2-acrylamido-2-methyl-1-propanesulfonic acid (AMPS), styrene sulfonic acid, allyl sulfonic acid, methallyl sulfonic acid, vinyl sulfonic acid, sodium salt of styrene sulfonate, vinylsulfonic acid, (meth)allylsulfonic acid, vinylphosphonic acid, N-vinylacetamide, N-methyl-N-vinylacetamide, N-vinylformamide, N-methyl-N-vinylformamide, N-vinylpyrrolidone, N-butyrolactam or N-vinylcaprolactam, maleic anhydride, itaconic acid, vinyl acetate, vinyl propanoate, vinyl butanoate, vinyl pentanoate, vinyl hexanoate, vinyl 2-methyl butanoate, vinyl 3-ethylpentanoate, dimethyldiallylammonium chloride, quaternized dimethylaminoethyl methacrylate (DMAEMA), methacrylamidopropyltrimethylammonium chloride, methylvinylimidazolium chloride, 2-vinylpyridine, 4-vinylpyridine, vinyl alcohol, a substituted or unsubstituted $(C_1-C_{20})$alkenoic acid, a substituted or unsubstituted $(C_1-C_{20})$alkenoic substituted or unsubstituted $(C_1-C_{20})$alkanoic anhydride, a substituted or unsubstituted $(C_1-C_{20})$alkenoic substituted or unsubstituted $(C_1-C_{20})$alkenoic anhydride, an N—$(C_1-C_{10})$alkenyl nitrogen-containing substituted or unsubstituted $(C_1-C_{10})$heterocycle, a salt thereof, a $(C_1-C_5)$alkyl ester thereof, or a combination thereof.

Embodiment 23 provides the method of Embodiment 22, wherein the polymer coating comprises a polymer or copolymer comprising a monomer unit chosen from pentaerythritol triallyl ether, a polyethyleneglycol-diacrylate, polyethyleneglycol-dimethacrylate, N,N'-methylenebisacrylamide, epichlorohydrin, divinyl sulfone, glycidyl methacrylate, alkyl diacrylate, ethylene glycol diacrylate, ethylene glycol dimethacrylate, polyethylene glycol diacrylate, polyethylene glycol dimethacrylate, ethoxylated bisphenol A diacrylate, ethoxylated bisphenol A dimethacrylate, ethoxylated trimethylol propane triacrylate, ethoxylated trimethylol propane trimethacrylate, ethoxylated glyceryl triacrylate, ethoxylated glyceryl trimethacrylate, ethoxylated pentaerythritol tetraacrylate, ethoxylated pentaerythritol tetramethacrylate, ethoxylated dipentaerythritol hexaacrylate, polyglyceryl monoethylene oxide polyacrylate, polyglyceryl polyethylene glycol polyacrylate, dipentaerythritol hexaacrylate, dipentaerythritol hexamethacrylate, neopentyl glycol diacrylate, neopentyl glycol dimethacrylate, pentaerythritol triacrylate, pentaerythritol trimethacrylate, trimethylol propane triacrylate, trimethylol propane trimethacrylate, tricyclodecane dimethanol diacrylate, tricyclodecane dimethanol dimethacrylate, 1,6-hexanediol diacrylate, 1,6-hexanediol dimethacrylate, or a combination thereof.

Embodiment 24 provides the method of any one of Embodiments 1-23, wherein the polymer coating comprises a polyurethane or a polyurea.

Embodiment 25 provides the method of any one of Embodiments 1-24, wherein the polymer coating comprises polyacrylamide (PA), a copolymer of acrylamide and a sulfonic acid-containing monomer, a copolymer of sulfonated styrene and maleic anhydride, a terpolymer of acrylamide, a sulfonic acid-containing monomer, a cationic acid-containing monomer, or a combination thereof.

Embodiment 26 provides the method of any one of Embodiments 1-25, wherein the crosslinker comprises a) a polymer comprising at least one nitrogen-containing repeating unit, or b) at least one of chromium, aluminum, antimony, zirconium, titanium, calcium, boron, iron, silicon, copper, zinc, magnesium, and an ion thereof, or a) and b).

Embodiment 27 provides the method of any one of Embodiments 1-26, wherein the crosslinker is at least one of a polyamine, a polyimine, a polyamide, a copolymer thereof, and a mixture thereof.

Embodiment 28 provides the method of any one of Embodiments 1-27, wherein the crosslinker is a poly($C_2$-$C_{10}$)alkyleneimine, polyalkyleneamine, a copolymer thereof, or a mixture thereof.

Embodiment 29 provides the method of any one of Embodiments 1-28, wherein the crosslinker is a poly($C_2$-$C_{10}$)hydrocarbyleneimine, wherein the ($C_2$-$C_{10}$)hydrocarbylene is independently substituted or unsubstituted and is interrupted by 0, 1, 2, or 3 atoms chosen from —O—, —S—, and substituted or unsubstituted —NH—.

Embodiment 30 provides the method of any one of Embodiments 1-29, wherein the crosslinker is a poly($C_2$-$C_{10}$)alkyleneimine having the following structure:

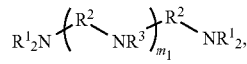

wherein
at each occurrence, $R^1$ is independently selected from the group consisting of —H and a substituted or unsubstituted ($C_1$-$C_{30}$)hydrocarbyl,
at each occurrence, $R^2$ is independently a substituted or unsubstituted ($C_2$-$C_{10}$)hydrocarbylene,
at each occurrence, $R^3$ is independently selected from the group consisting of —H, a substituted or unsubstituted ($C_1$-$C_{30}$)hydrocarbyl, and a substituted or unsubstituted ($C_2$-$C_{10}$)hydrocarbylene terminated with —NR$^3{}_2$, and m1 is about 0 to about 100,000.

Embodiment 31 provides the method of Embodiment 30, wherein at each occurrence $R^1$ is independently selected from the group consisting of —H and a substituted or unsubstituted ($C_1$-$C_{30}$)alkyl.

Embodiment 32 provides the method of any one of Embodiments 30-31, wherein at each occurrence $R^1$ is independently selected from the group consisting of —H and a ($C_1$-$C_{10}$)alkyl.

Embodiment 33 provides the method of any one of Embodiments 30-32, wherein at each occurrence, $R^2$ is independently ($C_2$-$C_{10}$)alkylene.

Embodiment 34 provides the method of any one of Embodiments 30-33, wherein at each occurrence, $R^2$ is independently ($C_2$-$C_5$)alkylene.

Embodiment 35 provides the method of any one of Embodiments 30-34, wherein at each occurrence, $R^2$ is ethylene.

Embodiment 36 provides the method of any one of Embodiments 30-35, wherein at each occurrence, $R^3$ is independently selected from the group consisting of —H, a substituted or unsubstituted ($C_1$-$C_{30}$)alkyl, and a substituted or unsubstituted —($C_2$-$C_{10}$)alkylene-NR$^3{}_2$.

Embodiment 37 provides the method of any one of Embodiments 30-36, wherein at each occurrence, $R^3$ is independently selected from the group consisting of —H, ($C_1$-$C_{10}$)alkyl, and a —($C_2$-$C_{10}$)alkylene-NR$^3{}_2$.

Embodiment 38 provides the method of any one of Embodiments 30-37, wherein at each occurrence, $R^3$ is independently selected from the group consisting of —H, and —(CH$_2$)$_2$—NR$^3{}_2$.

Embodiment 39 provides the method of any one of Embodiments 30-38, wherein m1 is about 1 to about 100.

Embodiment 40 provides the method of any one of Embodiments 1-39, wherein the crosslinker is polyethyleneimine (PEI).

Embodiment 41 provides the method of any one of Embodiments 4-40, wherein the crosslinked composition further comprises a crosslinking accelerant.

Embodiment 42 provides the method of Embodiment 41, wherein the crosslinking accelerant is a pH control compound.

Embodiment 43 provides the method of any one of Embodiments 41-42, wherein the crosslinking accelerant is an acid, a base, a salt thereof, of a combination thereof.

Embodiment 44 provides the method of any one of Embodiments 41-43, wherein the crosslinking accelerant is an alkali metal carbonate, an alkali metal bicarbonate, an alkali metal hydroxide, a Lewis acid, a mineral acid, an organic acid, or a combination thereof.

Embodiment 45 provides the method of any one of Embodiments 41-44, wherein the crosslinking accelerant is boric acid.

Embodiment 46 provides the method of any one of Embodiments 1-45, further comprising combining the crosslinked composition with an aqueous or oil-based fluid comprising a stimulation fluid, fracturing fluid, remedial treatment fluid, spotting fluid, abandonment fluid, or a combination thereof, to form a mixture, wherein the placing the crosslinked composition in the subterranean formation comprises placing the mixture in the subterranean formation.

Embodiment 47 provides the method of any one of Embodiments 1-46, wherein the crosslinked composition further comprises water, saline, aqueous base, oil, organic solvent, synthetic fluid oil phase, aqueous solution, alcohol or polyol, cellulose, starch, alkalinity control agent, acidity control agent, density control agent, density modifier, emulsifier, dispersant, polymeric stabilizer, polyacrylamide, polymer or combination of polymers, antioxidant, heat stabilizer, foam control agent, solvent, diluent, plasticizer, filler or inorganic particle, pigment, dye, precipitating agent, oil-wetting agent, set retarding additive, surfactant, corrosion inhibitor, gas, weight reducing additive, heavy-weight additive, lost circulation material, filtration control additive, salt, fiber, thixotropic additive, breaker, crosslinker, gas, rheology modifier, curing accelerator, curing retarder, pH modifier, chelating agent, scale inhibitor, enzyme, resin, water control material, polymer, oxidizer, a marker, Portland cement, pozzolana cement, gypsum cement, high alumina content cement, slag cement, silica cement, fly ash, metakaolin, shale, zeolite, a crystalline silica compound, amorphous silica, fibers, a hydratable clay, microspheres, pozzolan lime, or a combination thereof.

Embodiment 48 provides the method of any one of Embodiments 1-47, wherein the placing of the crosslinked composition in the subterranean formation comprises pumping the crosslinked composition through a tubular disposed in a wellbore and into the subterranean formation.

Embodiment 49 provides a system for performing the method of any one of Embodiments 1-48, the system comprising:
a tubular disposed in the subterranean formation; and
a pump configured to pump the crosslinked composition in the subterranean formation through the tubular.

Embodiment 50 provides a method of treating a subterranean formation, the method comprising:
placing in the subterranean formation a crosslinked composition comprising
proppant particles comprising polymer coatings thereon, wherein the polymer coatings are a water-swollen hydrogel comprising polyacrylamide (PA), a copolymer of acrylamide and a sulfonic acid-containing monomer, a copolymer of sulfonated styrene and maleic anhydride, a terpolymer of acrylamide, a sulfonic acid-containing monomer, a cationic acid-containing monomer, or a combination thereof; and
inter-particle crosslinks between the polymer coatings of at least some of the proppant particles, the inter-particle crosslinks comprising a crosslinker comprising polyethyleneimine (PEI).

Embodiment 51 provides a system comprising:
a tubular disposed in a subterranean formation; and
a pump configured to pump a pre-crosslinked composition, or a crosslinked product thereof, in the subterranean formation through the tubular, wherein the crosslinked product of the pre-crosslinked composition comprises
proppant particles comprising polymer coatings thereon; and
inter-particle crosslinks between the polymer coatings of at least some of the proppant particles, the inter-particle crosslinks comprising a crosslinker.

Embodiment 52 provides a pre-crosslinked composition for treatment of a subterranean formation, the composition comprising:
proppant particles comprising polymer coatings thereon; and
a crosslinker effective for forming inter-particle crosslinks between the polymer coatings of at least some of the proppant particles.

Embodiment 53 provides a crosslinked product of the pre-crosslinked composition of Embodiment 52.

Embodiment 54 provides a crosslinked composition for treatment of a subterranean formation, the crosslinked composition comprising:
proppant particles comprising polymer coatings thereon; and
inter-particle crosslinks between the polymer coatings of at least some of the proppant particles, the inter-particle crosslinks comprising a crosslinker.

Embodiment 55 provides a method of preparing a composition for treatment of a subterranean formation, the method comprising:

forming a pre-crosslinked composition or a crosslinked product thereof, the pre-crosslinked composition comprising
proppant particles comprising polymer coatings thereon; and
a crosslinker effective for forming inter-particle crosslinks between the polymer coatings of at least some of the proppant particles.

Embodiment 56 provide the method of Embodiment 55, further comprising crosslinking the pre-crosslinked composition to form a crosslinked composition.

Embodiment 57 provides the method, composition, or system of any one or any combination of Embodiments 1-56 optionally configured such that all elements or options recited are available to use or select from.

What is claimed is:

1. A method of treating a subterranean formation, comprising:
placing a pre-crosslinked composition in the subterranean formation, the pre-crosslinked composition comprising
a crosslinker and
proppant particles comprising polymer coatings thereon; and
crosslinking the pre-crosslinked composition, to form a crosslinked composition comprising:
the proppant particles; and
inter-particle crosslinks between the polymer coatings of at least some of the proppant particles, the inter-particle crosslinks comprising the crosslinker,
wherein the crosslinking occurs in the subterranean formation.

2. The method of claim 1, wherein the coated proppant particles are about 0.01 wt % to about 50 wt % of the crosslinked composition.

3. The method of claim 1, wherein the polymer coating covers about 80% to about 100% of the surface area of the proppant particles.

4. The method of claim 1, wherein the polymer coating has a thickness of about 0.1 micron to about 1,000 microns.

5. The method of claim 1, wherein the polymer coating comprises a polymer or copolymer comprising a monomer unit chosen from pentaerythritol triallyl ether, a polyethyleneglycol-diacrylate, polyethyleneglycol-dimethacrylate, N,N'-methylenebisacrylamide, epichlorohydrin, divinyl sulfone, glycidyl methacrylate, alkyl diacrylate, ethylene glycol diacrylate, ethylene glycol dimethacrylate, polyethylene glycol diacrylate, polyethylene glycol dimethacrylate, ethoxylated bisphenol A diacrylate, ethoxylated bisphenol A dimethacrylate, ethoxylated trimethylol propane triacrylate, ethoxylated trimethylol propane trimethacrylate, ethoxylated glyceryl triacrylate, ethoxylated glyceryl trimethacrylate, ethoxylated pentaerythritol tetraacrylate, ethoxylated pentaerythritol tetramethacrylate, ethoxylated dipentaerythritol hexaacrylate, polyglyceryl monoethylene oxide polyacrylate, polyglyceryl polyethylene glycol polyacrylate, dipentaerythritol hexaacrylate, dipentaerythritol hexamethacrylate, neopentyl glycol diacrylate, neopentyl glycol dimethacrylate, pentaerythritol triacrylate, pentaerythritol trimethacrylate, trimethylol propane triacrylate, trimethylol propane trimethacrylate, tricyclodecane dimethanol diacrylate, tricyclodecane dimethanol dimethacrylate, 1,6-hexanediol diacrylate, 1,6-hexanediol dimethacrylate, or a combination thereof.

6. The method of claim 1, wherein the polymer coating comprises a polyurethane or a polyurea.

7. The method of claim 1, wherein the polymer coating comprises polyacrylamide (PA), a copolymer of acrylamide and a sulfonic acid-containing monomer, a copolymer of sulfonated styrene and maleic anhydride, a terpolymer of acrylamide, a sulfonic acid-containing monomer, a cationic acid-containing monomer, or a combination thereof.

8. The method of claim 1, wherein the crosslinker is at least one of a polyamine, a polyimine, a polyamide, a copolymer thereof, and mixture thereof.

9. The method of claim 1, wherein the crosslinker is a poly($C_2$-$C_{10}$)alkyleneimine, polyalkyleneamine, a copolymer thereof, or a mixture thereof.

10. The method of claim 1, wherein the crosslinker is a poly($C_2$-$C_{10}$)hydrocarbyleneimine, wherein the ($C_2$-$C_{10}$)hydrocarbylene is independently substituted or unsubstituted and is interrupted by 0, 1, 2, or 3 atoms chosen from —O—, —S—, and substituted or unsubstituted —NH—.

11. The method of claim 1, wherein the crosslinker is a poly($C_2$-$C_{10}$)alkyleneimine having the following structure:

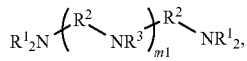

wherein:
at each occurrence, $R^1$ is independently selected from the group consisting of —H and a substituted or unsubstituted ($C_1$-$C_{30}$)hydrocarbyl,
at each occurrence, $R^2$ is independently a substituted or unsubstituted ($C_2$-$C_{10}$)hydrocarbylene,
at each occurrence, $R^3$ is independently selected from the group consisting of —H, a substituted or unsubstituted ($C_1$-$C_{30}$)hydrocarbyl, and a substituted or unsubstituted ($C_2$-$C_{10}$)hydrocarbylene terminated with —$NR^4_2$,
at each occurrence, $R^4$ is independently selected from the group consisting of H and a substituted or unsubstituted ($C_1$-$C_{30}$)hydrocarbyl, and
m1 is 0 to about 100,000.

12. The method of claim 11, wherein:
at each occurrence, $R^1$ is independently selected from the group consisting of —H and a ($C_1$-$C_{10}$)alkyl,
at each occurrence, $R^2$ is independently ($C_2$-$C_5$)alkylene,
at each occurrence, $R^3$ is independently selected from the group consisting of —H and —$(CH_2)_2$—$NR^4_2$,
at each occurrence, $R^4$ is independently selected from the group consisting of —H and a substituted or unsubstituted ($C_1$-$C_{10}$)hydrocarbyl, and
m1 is 1 to about 100.

13. The method of claim 1, wherein the crosslinker is polyethyleneimine (PEI).

14. The method of claim 1, wherein the crosslinked composition further comprises a crosslinking accelerant, and wherein the crosslinking accelerant is an alkali metal carbonate, an alkali metal bicarbonate, an alkali metal hydroxide, a Lewis acid, a mineral acid, an organic acid, or a combination thereof.

15. A system for performing the method of claim 1, the system comprising:
a tubular disposed in the subterranean formation; and
a pump configured to pump the crosslinked composition into the subterranean formation through the tubular.

16. A method of treating a subterranean formation, comprising:
placing a crosslinked composition in the subterranean formation, the crosslinked composition comprises:
proppant particles comprising polymer coatings thereon, wherein the polymer coatings are a water-swollen hydrogel comprising polyacrylamide, a copolymer of acrylamide and a sulfonic acid-containing monomer, a copolymer of sulfonated styrene and maleic anhydride, a terpolymer of acrylamide, a sulfonic acid-containing monomer, a cationic acid-containing monomer, or a combination thereof; and
inter-particle crosslinks between the polymer coatings of at least some of the proppant particles, the inter-particle crosslinks comprising a crosslinker comprising polyethyleneimine.

* * * * *